US012666349B2

(12) United States Patent
Roy et al.

(10) Patent No.: US 12,666,349 B2
(45) Date of Patent: Jun. 23, 2026

(54) SYSTEMS AND METHODS FOR SELECTING NON-TERRESTRIAL NETWORKS IN COMMUNICATION NETWORKS

(71) Applicant: Samsung Electronics Co., Ltd.,
Suwon-si (KR)

(72) Inventors: Koustav Roy, Bangalore (IN);
Pratibha K Satyaganapati, Bangalore
(IN); Arijit Sen, Bangalore (IN);
Gaorav Kumar Gupta, Bangalore
(IN); Akshita Johri, Bangalore (IN);
Aman Agarwal, Bangalore (IN); **Lalith
Kumar**, Bangalore (IN)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 312 days.

(21) Appl. No.: 18/406,787

(22) Filed: Jan. 8, 2024

(65) Prior Publication Data

US 2024/0236833 A1    Jul. 11, 2024

Related U.S. Application Data

(63) Continuation of application No.
PCT/KR2024/000237, filed on Jan. 5, 2024.

(30) Foreign Application Priority Data

Jan. 9, 2023    (IN) .............................. 202341001888
Dec. 19, 2023    (IN) ........................... 2023 41001888

(51) Int. Cl.
*H04W 48/18*    (2009.01)
*H04W 60/00*    (2009.01)
*H04W 84/04*    (2009.01)

(52) U.S. Cl.
CPC ........... *H04W 48/18* (2013.01); *H04W 60/00*
(2013.01); *H04W 84/042* (2013.01)

(58) Field of Classification Search
CPC ... H04W 48/18; H04W 60/00; H04W 84/042;
H04W 84/06
See application file for complete search history.

(56) References Cited

U.S. PATENT DOCUMENTS 8,036,654 B2    10/2011 Hind et al.
8,611,280 B2 *   12/2013 Morera ................. H04W 48/18
370/328

(Continued)

FOREIGN PATENT DOCUMENTS

EP        2 728 940 B1    3/2016
EP        3 751 908 A1    12/2020
WO       2020/202121 A1   10/2020
WO       2022/073472 A1    4/2022
WO       2022/155177 A1    7/2022

OTHER PUBLICATIONS

3GPP TR 38.811 V15.4.0, 3rd Generation Partnership Project;
Technical Specification Group Radio Access Network; Study on
New Radio (NR) to support non-terrestrial networks, (Release 15),
Oct. 8, 2020.

(Continued)

*Primary Examiner* — Siu M Lee
(74) *Attorney, Agent, or Firm* — Jefferson IP Law, LLP

(57) ABSTRACT

A method and a system for selecting Non-Terrestrial Networks (NTNs) in communication networks are provided. The method includes prioritizing a random terrestrial network (TN) over other NTNs, changing the scan pattern to accommodate combination of Bands, radio access technologies (RATS), and public land mobile networks (PLMNs), and pre-configuring PLMN priorities at the user equipment (UE).

19 Claims, 23 Drawing Sheets

(56)            References Cited

U.S. PATENT DOCUMENTS

| | | | |
|---|---|---|---|
| 9,826,451 B2 * | 11/2017 | Jung | H04W 48/18 |
| 2008/0287125 A1 * | 11/2008 | Hind | H04W 48/18 |
| | | | 455/432.1 |
| 2010/0261474 A1 | 10/2010 | Gollapudi et al. | |
| 2019/0394719 A1 | 12/2019 | Soliman et al. | |
| 2021/0185589 A1 | 6/2021 | Telang et al. | |
| 2021/0282084 A1 | 9/2021 | Catovic et al. | |
| 2021/0297940 A1 | 9/2021 | Prakasam et al. | |
| 2022/0141764 A1 | 5/2022 | Catovic et al. | |
| 2022/0232463 A1 | 7/2022 | Sadique et al. | |
| 2022/0232464 A1 | 7/2022 | Matolia et al. | |
| 2022/0369266 A1 | 11/2022 | Gruber et al. | |
| 2024/0063894 A1 * | 2/2024 | Vogedes | H04B 7/18504 |

OTHER PUBLICATIONS

3GPP TR 38.821 V16.2.0, 3rd Generation Partnership Project; Technical Specification Group Radio Access Network; Solutions for NR to support non-terrestrial networks (NTN), (Release 16), Apr. 3, 2023.

3GPP TS 24.301 V18.4.0, 3rd Generation Partnership Project; Technical Specification Group Core Network and Terminals; Non-Access-Stratum (NAS) protocol for Evolved Packet System (EPS); Stage 3, (Release 18), Sep. 22, 2023.

3GPP TS 23.502 V18.3.0, 3rd Generation Partnership Project; Technical Specification Group Services and System Aspects; Procedures for the 5G System (5GS); Stage 2, (Release 18), Sep. 19, 2023.

3GPP TS 38.331 V17.6.0, 3rd Generation Partnership Project; Technical Specification Group Radio Access Network; NR; Radio Resource Control (RRC) protocol specification, (Release 17), Sep. 28, 2023.

3GPP TS 36.331 V17.6.0, 3rd Generation Partnership Project; Technical Specification Group Radio Access Network; Evolved Universal Terrestrial Radio Access (E-UTRA); Radio Resource Control (RRC); Protocol specification, (Release 17), Sep. 28, 2023. Efficient PLMN Selection in Regenerative Non-Terrestrial Network, 2022.

International Search Report and Written Opinion dated Apr. 9, 2024, issued in International Patent Application No. PCT/KR2024/000237.

* cited by examiner

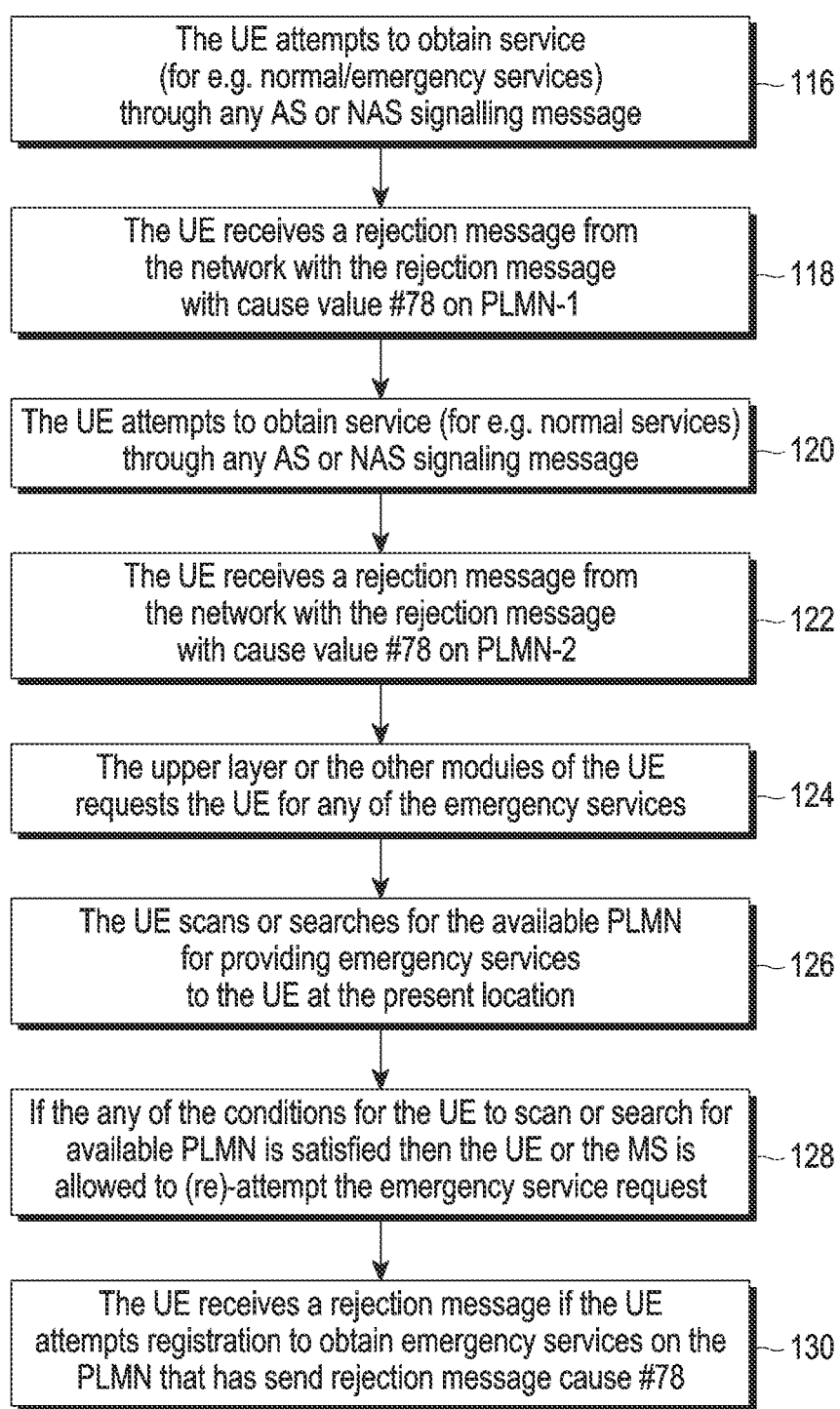

The UE attempts to obtain service
(for e.g. normal/emergency services)
through any AS or NAS signalling message ~116

The UE receives a rejection message from
the network with the rejection message
with cause value #78 on PLMN-1 ~118

The UE attempts to obtain service (for e.g. normal services)
through any AS or NAS signaling message ~120

The UE receives a rejection message from
the network with the rejection message
with cause value #78 on PLMN-2 ~122

The upper layer or the other modules of the UE
requests the UE for any of the emergency services ~124

The UE scans or searches for the available PLMN
for providing emergency services
to the UE at the present location ~126

If the any of the conditions for the UE to scan or search for
available PLMN is satisfied then the UE or the MS is
allowed to (re)-attempt the emergency service request ~128

The UE receives a rejection message if the UE
attempts registration to obtain emergency services on the
PLMN that has send rejection message cause #78 ~130

FIG. 1C
(RELATED ART)

PLMN Configuration in UE
HPLMN: PLMN-1
OPLMN: PLMN-2, PLMN-3
NTN PLMN list: PLMN-X,
PLMN-Y UE performs PLMN
search procedure ~802

UE finds below PLMN
list after PLMN search:
1. PLMN-X
2. Rx-1
3. PLMN-2 ~804

UE considers PLMN priority as below:
1. PLMN-2 (Present in OPLMN list)
2. Rx-1 (Random PLMN as not present in any PLMN list)
3. PLMN-X (Present in NTN PLMN List) ~806

Figure 14B:
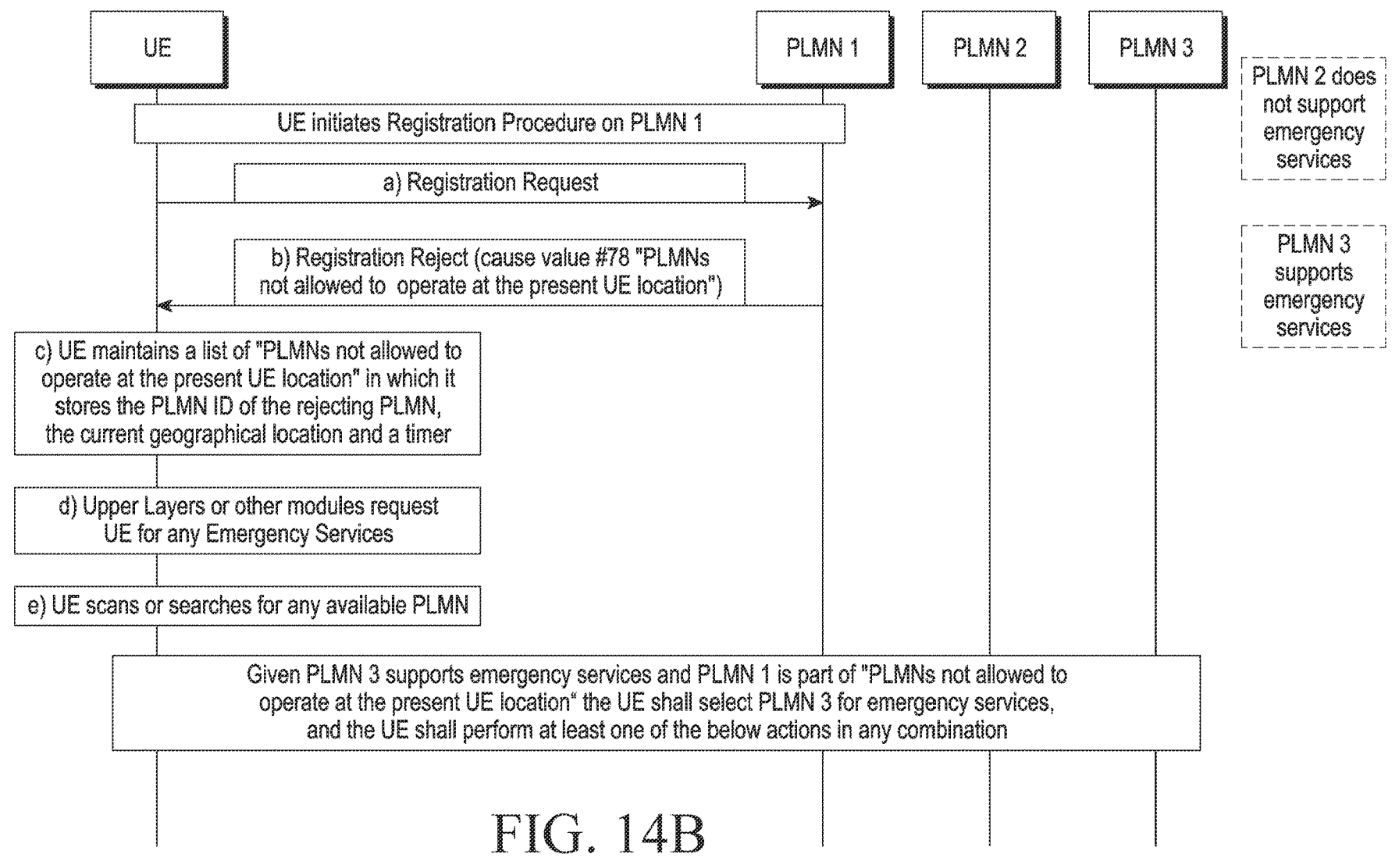

PLMN 2 does not support emergency services

PLMN 3 supports emergency services

PLMN 3

PLMN 2

PLMN 1

UE initiates Registration Procedure on PLMN 1 a) Registration Request b) Registration Reject (cause value #78 "PLMNs not allowed to operate at the present UE location")

c) UE maintains a list of "PLMNs not allowed to operate at the present UE location" in which it stores the PLMN ID of the rejecting PLMN, the current geographical location and a timer d) Upper Layers or other modules request UE for any Emergency Services e) UE scans or searches for any available PLMN Given PLMN 3 supports emergency services and PLMN 1 is part of "PLMNs not allowed to operate at the present UE location" the UE shall select PLMN 3 for emergency services, and the UE shall perform at least one of the below actions in any combination

SYSTEMS AND METHODS FOR SELECTING NON-TERRESTRIAL NETWORKS IN COMMUNICATION NETWORKS

CROSS-REFERENCE TO RELATED APPLICATION

This application is a continuation application, claiming priority under § 365(c), of an International application No. PCT/KR2024/000237, filed on Jan. 5, 2024, which is based on and claims the benefit of an Indian Provisional patent application number 202341001888, filed on Jan. 9, 2023, in the Indian Intellectual Property Office, and of an Indian Non-Provisional patent application number 202341001888, filed on Dec. 19, 2023, in the Indian Intellectual Property Office, the disclosure of each of which is incorporated by reference herein in its entirety.

BACKGROUND

1. Field

The disclosure relates to wireless communication networks. More particularly, the disclosure relates to selecting Non-Terrestrial Networks (NTNs) in communication networks.

2. Description of Related Art

As per third generation partnership project (3GPP) aspect of satellite communication, initial $5^{th}$ generation non-terrestrial networks (5G NTN) deployments focus on a universal connectivity and coverage, separating the technology into two facets, new radio non-terrestrial network-NTN (NR-NTN) and internet of things—NTN (IoT-NTN).

FIG. 1A depicts an overview of NTNs according to the related art.

Integration and co-existence of satellite and terrestrial systems has become important and may require increased standardization and collaboration between the satellite and telecom industry. This may benefit both satellite and mobile operators by enabling new services, additional access availability and providing remote and rural areas with increased connectivity.

There have been advances made with 3GPP release 17, however there is much more to be addressed for co-existence as these integrated systems get deployed. 3GPP is currently discussing the architecture and measures of implementing satellite communication.

A satellite system in general is a limited resource system. Most of the operators that are coming up with the satellite system mainly want a user equipment (UE) to choose a satellite network as last resort, i.e., after the UE exhausts all system search and not finding any suitable terrestrial system to select.

In an example scenario, a network may put satellite public land mobile network (PLMN) as a last entry of an operator preferred PLMN (OPLMN) list to make sure that the UE only selects a non-terrestrial network after no OPLMN is found. The network makes sure that the UE follows a home public land mobile network (HPLMN) and an equivalent home public land mobile network (EHPLMN) first, followed by user preferred PLMNs if any, then followed by terrestrial operator preferred lLMN (OPLMN) and then select the non-terrestrial network PLMNs.

However, having the satellite PLMN as a part of OPLMN list will force the UE to prioritise non-terrestrial network (NTN) PLMN over terrestrial random (TN) PLMNs, that are available at that location. So, putting non-terrestrial network PLMNs as the last entry of OPLMN list is not enough for the UE to consider Satellite Network as last resort.

In another example scenario, if the network does not provide Non terrestrial Network PLMN in the OPLMN list, then Satellite PLMN will be considered as a random PLMN. In that case too, the UE may select the random PLMN based on signal condition and not as per the terrestrial or the non-terrestrial network type. So, it may never be guaranteed that the satellite PLMN will be considered as a last priority.

Furthermore, if the UE finds out more than one satellite system supporting PLMN during PLMN search then it is not clear as to which system does the UE have to prioritise over other satellite PLMNs.

With Respect to NTN communication, there can be 3 possible ways of associating public land mobile networks (PLMNs) for TN and NTN. In one scenario, both TN and NTN have different PLMNs. For example, TN PLMN can be P1, and NTN PLMN can be SX-1 (referred to as CASE 1), as depicted in Table 1.

TABLE 1

| PLMN | TN/NTN |
|------|--------|
| P1   | TN     |
| SX-1 | NTN    |

In a second scenario, both TN and NTN have the same PLMN, but different band frequencies, as depicted in Table 2. For example, TN PLMN can be P1, and NTN PLMN can be P1 only, but for TN P1, band frequencies as B1, B2, B4, B6 can be used. While in NTN P1 PLMN, B3, and Bx band frequencies are being used.

TABLE 2

| PLMN | Band Frequencies | TN/NTN |
|------|------------------|--------|
| P1   | B1, B2, B4, B6   | TN     |
| P1   | B3, Bx           | NTN    |

In a third scenario, both TN and NTN have the same PLMN, as well as the same frequencies. For example, TN PLMNs is P1 & NTN PLMN may be P1 and both of them use the same set of bands B1, B2, as depicted in Table 3.

TABLE 3

| PLMN | Band Frequencies | TN/NTN |
|------|------------------|--------|
| P1   | B1, B2           | TN     |
| P1   | B1, B2           | NTN    |

When the UE does not find any PLMN to camp on, after searching all the PLMNs available in operator preferred list, the UE searches for other random TN PLMNs available. In the initial deployment stages, an NTN PLMN will be providing a limited or selected number of services to the user. Examples of the services can be short message service (SMS), voice, data, multimedia messaging service (MMS), and so on. Hence, there is a need for prioritising the PLMNs to be searched, depending on the user/operator needs and/or available services. Depiction of services associated with PLMNs is shown in Table 4.

TABLE 4

| PLMN | Services |
|------|----------|
| PLMNr-1 | SMS, Voice, Data, MMS |
| Sx-1 | SMS |
| Sx-2 | SMS, Voice |

Consider a scenario, wherein the UE is attempting to identify and camp on an NTN, when both TN and NTN have the same PLMN, but different frequencies. Consider the deployment scenario, depicted in Table 5.

TABLE 5

| PLMN | Type of network | Band Frequency |
|------|-----------------|----------------|
| PLMN A | TN | B1, B3, B5 |
| PLMN A | NTN | B4, Box |
| PLMN B | NTN | B7, By, Bz |
| PLMN B | TN | B6, B9 |

In this case, differentiating the PLMN search based on TN & NTN is not feasible since the NTN cannot be identified with just the PLMN identifier (ID).

In another scenario, the UE may identify and camp on NTN when both TN and NTN have the same PLMN and same band/frequencies. Consider the deployment scenario, depicted in Table 6.

TABLE 6

| PLMN | Type of network | Band Frequency |
|------|-----------------|----------------|
| PLMN A | TN | B1, B3, B5 |
| PLMN A | NTN | B4, Bx |
| PLMN B | NTN | B7, By, Bz |
| PLMN B | TN | B6, B9 |

In another scenario, the UE may need more power to a transceiver via NTN considering the enormous distance at which satellites are placed. Optimizing power consumption is an important aspect especially when the UE is in emergency or limited services since a battery is one of the critical resources.

In another example scenario, in order to avoid repeated attempts to obtain service on a PLMN on a non-terrestrial network (e.g., through a satellite next generation radio access network (NG-RAN) access technology), when a mobile station (MS) or the UE receives an integrity protected rejection message (e.g., with emm cause value #78 or any reject cause to indicate "PLMNs not allowed to operate at the present UE location" in any downlink (DL) non-access stratum (NAS) message, e.g., Attach Reject or TAU reject, and the like) from the non-terrestrial network, the UE or the MS maintains a list of "PLMNs not allowed to operate at the present UE location". The UE or the MS stores the PLMN ID of the rejecting PLMN, the current geographical location and a timer in a data store. For 3GPP non-terrestrial networks such as satellite NG-RAN, the UE shall store a list of "PLMNs not allowed to operate at the present UE location". Each entry of the list may include but is not limited to, a) the PLMN identity of the PLMN which sent a message including 5G mobility management (5GMM) cause value #78 "PLMN not allowed to operate at the present UE location" through the non-terrestrial network; (b) a geographical location, where 5GMM cause value #78 was received on the particular non-terrestrial network, if the location is accessible to the UE, and (c) if the geographical location is known, the UE sets a specific distance value. The UE shall not set the specific distance value to a value smaller than the value indicated by the network, given that the network has pre-set a threshold value.

Before storing a new entry for a PLMN in the list, the UE deletes an existing entry with the same PLMN identity. Upon storing a new entry, the UE starts a timer instance associated with the entry with the implementation specific value.

The UE is allowed to attempt to access a PLMN through the non-terrestrial network access technology from the list of PLMNs not allowed to operate at the particular UE location only when (a) the current UE location is known, the geographical location is stored for the entry of the particular PLMN, and the distance to the current UE location is larger than the UE implementation specific value. The UE implementation specific value shall not be set to a value smaller than the value indicated by the network. (b) the timer associated with the entry of the particular PLMN has expired, or (c) the access to the PLMN is for emergency services.

The list for the PLMN not allowed to operate at the particular location shall accommodate three or more entries. The maximum number of entries is an implementation decision. When the list is full and a new entry has to be inserted, an oldest entry is deleted. Each entry shall be removed if for the entry, (a) the UE successfully registers through the non-terrestrial network to the PLMN stored in the entry, or (b) the timer instance associated with the entry expires.

The UE may delete the entry in the list when the current UE location is known. The UE may also delete the entry in the list when a geographical location is stored for the entry of this PLMN, and the distance to the current UE location is larger than a UE implementation specific value. If the UE is in a 5GMM-DEREGISTERED. LIMITED-SERVICE state and the entry from the list of PLMNs not allowed to operate at the present UE location is removed, the UE shall perform PLMN selection according to 3GPP TS 23.122 standard.

In another scenario when the UE is switched off, the UE s keeps the list of "PLMNs not allowed to operate at the present UE location" in its non-volatile memory. The UE deletes the list of PLMNs not allowed to operate at the present UE location if the universal subscriber identity module (USIM) is removed.

The UE or the MS maintains a list of "PLMNs not allowed to operate at the present UE location". The UE or MS stores the PLMN ID of the rejecting PLMN, the current geographical location and a timer in order to prevent repeated attempts to obtain service on the PLMN through the non-terrestrial network, when the MS or the UE receives an integrity protected reject message with cause value #78 "PLMNs not allowed to operate at the present UE location".

The UE is allowed to (re)-attempt the emergency service request for emergency service sessions on the PLMN has rejected the UE registration with "PLMN not allowed to operate in the country of the UE's location" (cause code #78), only if the non-terrestrial network is the only network available to the UE.

FIG. 1B shows a sequential diagram illustrating signalling between the UE, the PLMNs, according to the related art.

The conventional method to register on a non-terrestrial network in caser of emergency services may include the following operations at operation 102, the UE may attempt to obtain service (through any access stratum (AS) or the like) on a PLMN through the non-terrestrial network using one of a NAS Signalling message, e.g., Registration Request or Service Request. At operation 104, the UE may receive a rejection message from the network with cause value #78 "PLMNs not allowed to operate at the present UE location". At operation 106, the UE or the MS maintains a list of "PLMNs not allowed to operate at the present UE location" and stores the PLMN ID of the rejecting PLMN with the current geographical location and the timer.

Now, in the conventional scenario, at operation 108, in case an upper layer of the UE such as an application processor or any other module of the UE requests the UE for registering on the PLMN for emergency services (e.g., emergency call), the UE may scan or search for any available PLMN for emergency service session. At operation 110, the UE may scan for emergency service session if the PLMN exists in the list of "PLMNs not allowed to operate at the present UE location" and the entry for the PLMN includes the geographical location, and the UE determines that the distance to the current UE location is smaller than a UE implementation specific value. The UE may also scan for the emergency service sessions if the entry for the PLMN does not include a geographical location or the UE cannot determine whether the distance to the current UE location is smaller than a UE implementation specific value. The UE may also scan for the emergency service sessions if there is only one available PLMN/access technology combination, which does not support emergency services. At operation 112, the network may reject the UE's registration or service request message for emergency services with any reject message (e.g., Registration Reject message or Service Reject message, and the like) with cause "Emergency services not supported" indicating this reject is for emergency services. The network may also use an indication to inform the UE that the rejection is for the emergency services only. Alternatively, the network (e.g., any 5G core network function such as access and mobility management function (AMF)) may inform the UE that the emergency services are allowed or not allowed on the broadcasted PLMN identity (PLMN-ID).

In this case, at operation 114, when MS attempts for emergency services on the available PLMN combination that does not support emergency services, then MS does not receive emergency services from the available PLMN or the network combination. The PLMN or the network combination is different from PLMN and the network combinations that meet the conditions to establish an emergency service session and the access technology is satellite NG-RAN or satellite evolved universal terrestrial radio access network (E-UTRAN). Also, MS may not attempt to register for the emergency services (e.g., via emergency registration) on the PLMN in the list of "PLMNs not allowed to operate at the present UE location." Thus, the MS or the UE fails to connect to the emergency services on any PLMN or the network combination.

FIG. 1C shows a sequential diagram illustrating signalling between the UE, the PLMNs, according to the related art.

The method describes selecting a PLMN from the list of PLMNs having PLMNs not allowed to operate at the present UE location" (e.g., PLMN-1 or PLMN-2), and attempt registration for emergency services. At operation 116, the UE attempts to obtain service (e.g., normal or emergency services) (through any AS or NAS signalling message, e.g., Registration Request or Service Request, and the like) on a PLMN (e.g., first PLMN (PLMN-1)) through the non-terrestrial network. At operation 118, the network (e.g., PLMN-1) rejects the UE's registration or the service request message with the rejection message with cause value #78 "PLMNs not allowed to operate at the present UE location".

For example—PLMN-1 rejects the UE's registration request or the service request message for emergency services with any rejection message with cause value #78.

At operation 120, the UE attempts to obtain service (e.g., normal services) through any AS or NAS signalling message, e.g., Registration Request or Service Request, and the like, on another PLMN (e.g., PLMN-2) through non-terrestrial network. At operation 122, the UE receives a rejection message from the network with the rejection message with cause value #78 "PLMNs not allowed to operate at the present UE location". For example, PLMN-2 rejects the UE's registration at the rejection message with cause value #78.

The UE or the MS maintains a list of "PLMNs not allowed to operate at the present UE location" and stores the PLMN ID of the rejecting PLMN(s) (e.g., PLMN-1, PLMN-2), the current geographical location and a timer associated with each rejected PLMN ID(s). At operation 124, the upper layer or the other modules of the UE requests the UE for any of the emergency services (e.g., emergency call)

At operation 126, the UE scans or searches for the available PLMN for providing emergency services to the UE at the present location.

In an example scenario, for establishing the emergency service sessions in case only network or PLMN(s) (e.g., PLMN-1, PLMN-2) available to the UE belonging to the non-terrestrial network. The UE may have already received a rejection message from the available PLMN for the UE registration with "PLMN not allowed to operate in the country of the UE's location" cause code #78. The UE shall attempt registration for the emergency services (e.g., via emergency registration) on any of those PLMN(s) (e.g., PLMN-1 or PLMN-2) through the non-terrestrial networks.

In another scenario, UE may scan or search for any available PLMN for emergency service session. The UE may scan for emergency service session if the PLMN exists in the list of PLMNs not allowed to operate at the present UE location. I) The UE may also scan for emergency service session if the list of PLMNs not allowed includes the geographical location, and the UE determines that the distance to the current UE location is smaller than a UE implementation specific value. The UE may also scan for emergency service session if the list of PLMNs not allowed does not include a geographical location or the UE cannot determine whether the distance to the current UE location is smaller than a UE implementation specific The UE may also scan for emergency service session if there is no available PLMN or network combination that supports emergency services apart from the PLMN or the network combinations where the PLMN is a PLMN that meet the conditions to establish an emergency service session and the non-terrestrial network for example may be one of the satellite NG-RAN or satellite E-UTRAN. At operation 128, if the any of the above conditions for the UE to scan or search for available PLMN is satisfied then the UE or the MS is allowed to (re)-attempt the emergency service request or select and attempt registration on any of the PLMN(s) (e.g., PLMN-1, PLMN-2) that may be present in the list of "PLMNs not allowed to operate at the present UE location".

However, in the current method defined for the UE to decide the PLMN to select first for emergency services from the list of "PLMNs not allowed to operate at the present UE location". For example, if the UE or the MS selects the PLMN (e.g., PLMN-1), on which UE has received an optionally integrity protected, reject message with cause value #78 "PLMNs not allowed to operate at the present UE location" from the non-terrestrial network (e.g., PLMN-1)

when UE attempted registration to obtain emergency services on that PLMN, and if UE (re)-attempts the registration/service for emergency services on the PLMN(s) (e.g., PLMN-1), there is a possibility that the network or the PLMN (e.g., PLMN-1) may reject the UE's request for emergency services. At operation 130, the UE receives a rejection message if the UE attempts registration to obtain emergency services on the PLMN that has send rejection message cause #78. Alternatively, the UE may not be able to get emergency services on the PLMN-1, and there might be a delay in getting emergency services from other PLMN(s) (e.g., PLMN-2) in the list of "PLMNs not allowed to operate at the present UE location". The other PLMN(s) (e.g., PLMN-2) in the list of "PLMNs not allowed to operate at the present UE location" may be those PLMN(s) which the UE has not selected or attempted for emergency services. The other PLMN in the list may be the PLMN(s) where the UE may have selected or attempted for emergency services but did not get any reject from the Network or the PLMN (e.g., PLMN-2) for emergency services.

Also, the UE may repeatedly (re)-attempt registering for emergency services (e.g., via emergency registration) on a PLMN (e.g., PLMN-1) through non-terrestrial networks even though the selected PLMN does not support emergency services for the UE at the present UE location. Repeated re-attempts may lead to unnecessary signalling and wastage of UE and Network resources.

Currently, there is no method for the UE or the MS to decide which PLMN(s) (e.g., PLMN-1 or PLMN-2), present in the list of "PLMNs not allowed to operate at the present UE location" to select and attempt registration for emergency services (e.g., via emergency registration). If the only network or the PLMN(s) (e.g., PLMN-1, PLMN-2) available to the UE is that of non-terrestrial network where the PLMN has rejected the UE registration with "PLMN not allowed to operate in the country of the UE's location" (cause code #78).

There is a need in the art for solutions which will overcome the above-mentioned drawback(s), among others.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for selecting Non-Terrestrial Networks (NTNs) in communication networks.

Another aspect of the disclosure is to provide methods and systems for prioritizing a random terrestrial network (TN) over other NTNs.

Another aspect of the disclosure is to provide methods and systems for changing the scan pattern to accommodate combination of bands, RATS and PLMNs.

Another aspect of the disclosure is to provide methods and systems for differentiating NTNs and TNs from extended NAS and AS timers.

Another aspect of the disclosure is to provide methods and systems for pre-configuring PLMN priorities at the UE.

Another aspect of the disclosure is to provide methods and systems for identifying NTNs using timing advance.

Another aspect of the disclosure is to provide methods and systems for optimizing and saving battery life when connected to NTN in a remote area.

Another aspect of the disclosure is to provide a method and a system for handling emergency services in wireless communication, when PLMN is not allowed to operate at the present UE location.

Additional aspects will be set forth in part in the description which follows and, in part, will be apparent from the description, or may be learned by practice of the presented embodiments.

SUMMARY

In accordance with an aspect of the disclosure, a method at a user equipment (UE) for selecting a public land mobile network (PLMN) is provided. The method includes identifying, by the UE, a network type of one or more PLMNs available in a network coverage area of the UE. The network type comprises at least one of a terrestrial network (TN) and a non-terrestrial network (NTN). The method further comprises performing a selection of the one or more PLMN based on the network type. The UE prioritizes the PLMN based on network type of the PLMN. Furthermore, the method comprises prioritizing by the UE, the terrestrial network over the non-terrestrial network, on the terrestrial network becoming available in the network coverage area of the UE, on the UE finding the terrestrial network and the non-terrestrial network in a same network coverage area.

In accordance with another aspect of the disclosure, a method at a user equipment (UE) for selecting a public land mobile network (PLMN) is provided. The method includes identifying, by the UE, a network type and services provided by one or more PLMNs available in a network coverage area of the UE. The network type comprises at least one of a terrestrial network (TN) and a non-terrestrial network (NTN). The method further comprises performing by the UE, a combinational scan to identify the one or more PLMN and the network type, the services provided by the one or more PLMNs, and a frequency band of the one or more PLMNs. The method furthermore comprises optimizing by the UE, a scan pattern(s) to segregate the one or more PLMNs, the frequency band, and the services provided according to the network type. Further the method comprises grouping by the UE, the frequency band, the services provided for a particular PLMN according to the network type as a group. The terrestrial network and the non-terrestrial network are registered over a first PLMN. The method further comprises determining by the UE, a priority of the group based on the network type and the services provided by the PLMN. The UE prioritizes the PLMN based on a number of service(s) provided by the one or more PLMNs. The method comprises prioritizing by the UE, the group for the terrestrial network over the group for the non-terrestrial network, whenever the group for the terrestrial network becomes available in the network coverage area of the UE.

In accordance with another aspect of the disclosure, a user equipment (UE) in a wireless communication system is provided. The UE includes a transceiver, memory, and one or more processors coupled with the transceiver and the memory. The memory store one or more computer programs including computer-executable instructions that, when executed by the one or more processors, cause the UE to identify a network type and services provided by one or more public land mobile networks (PLMNs) available in a network coverage area of the UE. The network type comprises at least one of a terrestrial network (TN) and a non-terrestrial network (NTN). Further the UE is configured to perform, a selection of the one or more PLMN based on the network type and the services provided by the PLMN. The UE prioritizes the PLMN based on a number of services provided by the one or more PLMN. Further the UE is configured to prioritize the terrestrial network (TN) over the non-terrestrial network (NTN), on the terrestrial network (TN) becoming available in the network coverage area of the UE, given that the UE found both terrestrial network and non-terrestrial network in a same network coverage area.

In accordance with another aspect of the disclosure, a user equipment (UE) in a wireless communication system is provided. The UE includes a transceiver, memory, and at least one or more processors coupled with the transceiver and the memory. The memory store one or more computer programs including computer-executable instructions that, when executed by the one or more processors, cause the UE to identify a network type and services provided by one or more public land mobile network (PLMN) available in a network coverage area of the UE. The network type comprises at least one of a terrestrial network (TN) and a non-terrestrial network (NTN). Further the UE is configured to perform, a combinational scan to identify the one or more PLMN and the network type, the services provided by the one or more PLMNs, and, a frequency band of the one or more PLMNs. Further the UE is configured to optimize, a scan patterns to segregate the one or more PLMNs, the frequency band, and the services provided according to the network type. Further the UE is configured to group, the frequency band, the services provided for a particular PLMN according to the network type as a group. The terrestrial network and the non-terrestrial network are registered over the first PLMN. Further the UE is configured to determine, a priority of the group based on the network type and the services provided by the PLMN. The UE prioritizes the PLMN based on a number of services provided by the one or more PLMNs. Further the UE is configured to prioritize, the group for the terrestrial network over the group for the non-terrestrial network, whenever the group for the terres-trial network becomes available in the network coverage area of the UE.

In accordance with another aspect of the disclosure, a method and a system for handling emergency services in wireless communication are provided. The proposed method handles emergency services in wireless communication, when PLMN is not allowed to operate at the present UE Location.

In accordance with another aspect of the disclosure, a method for selecting a PLMN is provided. The method includes attempting by the UE to obtain a service on a PLMN through a non-terrestrial network. The method fur-ther comprises receiving by the UE a rejection message from the network for the UE's registration request. The method further comprises maintaining a list, by the UE, of PLMNs not allowed to operate at the present UE location in which the UE stores the PLMN ID of the rejecting PLMN, the current geographical location, and a timer. The method further comprises receiving a request by the UE from the upper layer of the UE for an emergency service. The method furthers comprises scanning by the UE for any available PLMN that provide emergency services. In an embodiment, the UE scans for emergency services if the UE determines that there exists an entry for the PLMN in the list of PLMNs not allowed to operate at the present UE location. the UE scans for emergency services if the UE determines that the entry for the PLMN includes a geographical location, and the UE determines that the distance to the current UE location is smaller than a UE implementation specific value; or the UE determines that the entry for the PLMN does not include a geographical location or the UE cannot determine whether the distance to the current UE location is smaller than a UE implementation specific value. the UE also scans for emergency services if the UE determines that there is only one available PLMN or network combination not supporting emergency services. In an embodiment, the UE may determine that none of the PLMN supports emergency services that are different from PLMN combinations where the PLMN meets the conditions meet the conditions to establish an emergency service session and the access tech-nology is one of the non-terrestrial networks for example, satellite NG-RAN or satellite E-UTRAN.

In accordance with another aspect of the disclosure, a method and a system for handling of emergency services when PLMN is not allowed to operate at the present UE location, are provided. A UE attempts registration (e.g., for emergency services) on the first PLMN through a non-terrestrial network such as satellite NG-RAN access tech-nology or satellite E-UTRAN access technology. The UE may receive a rejection message cause value #78 "PLMNs not allowed to operate at the present UE location". Upon receiving the rejection message for registration, the UE attempts registration (e.g., for normal services) on a second PLMN through the non-terrestrial network. Upon receiving the rejection message, the UE maintains a list of "PLMNs not allowed to operate at the present UE location" in which it stores the PLMN ID of the rejecting PLMNs (PLMN-1, PLMN-2), the current geographical location and a timer.

In an embodiment, the UE shall maintain separate lists or two different lists of PLMNs not allowed to operate at the present UE location for normal services and emergency services respectively. For example, for PLMNs (e.g., PLMN-2) indicating reject cause #78 for normal services, the UE may maintain list of PLMNs, i.e., the list of "PLMNs not allowed to operate at the present UE location". And for PLMNs (e.g., PLMN-1) indicating reject cause #78 for emergency services, the UE may maintain another list of PLMNs, i.e., the list of "PLMNs not allowed to operate at the present UE location for emergency services".

In another embodiment, the UE maintains a common list or only one list of "PLMNs not allowed to operate at the present UE location". The UE shall remember or keep a track that the rejecting PLMN ID (e.g., PLMN-1) on which the UE has received the rejection message (e.g., Reject Cause #78) while registering for emergency services over the non-terrestrial network. Alternatively, the rejecting PLMN ID (e.g., PLMN-1) is not allowed for emergency services over the non-terrestrial network, if the rejection message (or indication) from the network with cause value #78 is received while UE is registering for emergency services.

Furthermore, the UE receives request from upper layers or other modules for any emergency services. Further, the UE scans or searches for any available PLMN which may provide emergency services. For emergency service ses-sions, if the only network/PLMNs (e.g., PLMN-1, PLMN-2) available to the UE is that of a satellite NG-RAN or satellite E-UTRAN where the PLMN has rejected the UE registra-tion with "PLMN not allowed to operate in the country of the UE's location" (cause code #78), UE shall attempt registration/service for emergency services (e.g., via emer-gency registration) on those PLMNs (e.g., PLMN-1 or PLMN-2) through satellite NG-RAN access technology or satellite E-UTRAN Access technology. The UE will select PLMN-2 over PLMN-1 because UE has got a reject cause #78 over PLMN-1 for emergency services. The UE attempts registration for emergency services on PLMN-2 through satellite NG-RAN access technology or satellite E-UTRAN access technology.

In accordance with another aspect of the disclosure, one or more non-transitory computer-readable storage media storing one or more computer programs including computer-executable instructions that, when executed by one or more processors of a user equipment (UE), cause the UE to perform operations for selecting a public land mobile network (PLMN) are provided. The operations including identifying, by the UE, a network type of one or more PLMNs available in a network coverage area of the UE, the network type comprising at least one of a terrestrial network (TN) and a non-terrestrial network (NTN), performing, by the UE, a selection of the one or more PLMN based on the network type; the UE prioritizing the PLMN based on network type of the PLMN; and prioritizing, by the UE, the terrestrial network over the non-terrestrial network, when the terrestrial network becomes available in the network coverage area of the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1C is a sequential diagram illustrating signalling between a UE, PLMNs, according to the related art;

FIG. 14B illustrates a scenario where the PLMN supports emergency services, according to an embodiment of the disclosure.

Throughout the drawings, like reference numerals will be understood to refer to like parts, components, and structures.

DETAILED DESCRIPTION

Figure 1A:
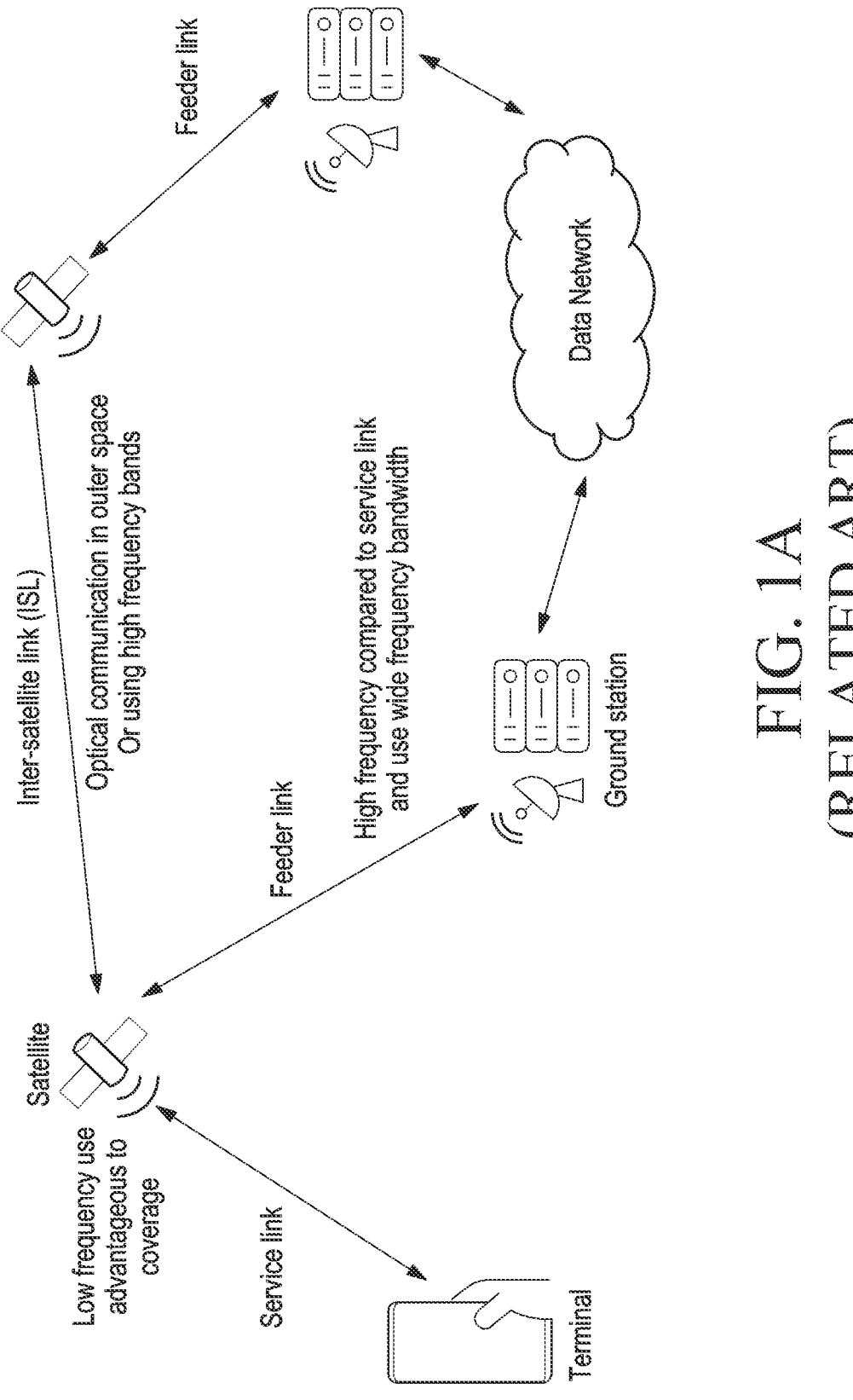
FIG. 1A depicts an overview of non-terrestrial networks NTNs, according to the related art.
Figure 1B:
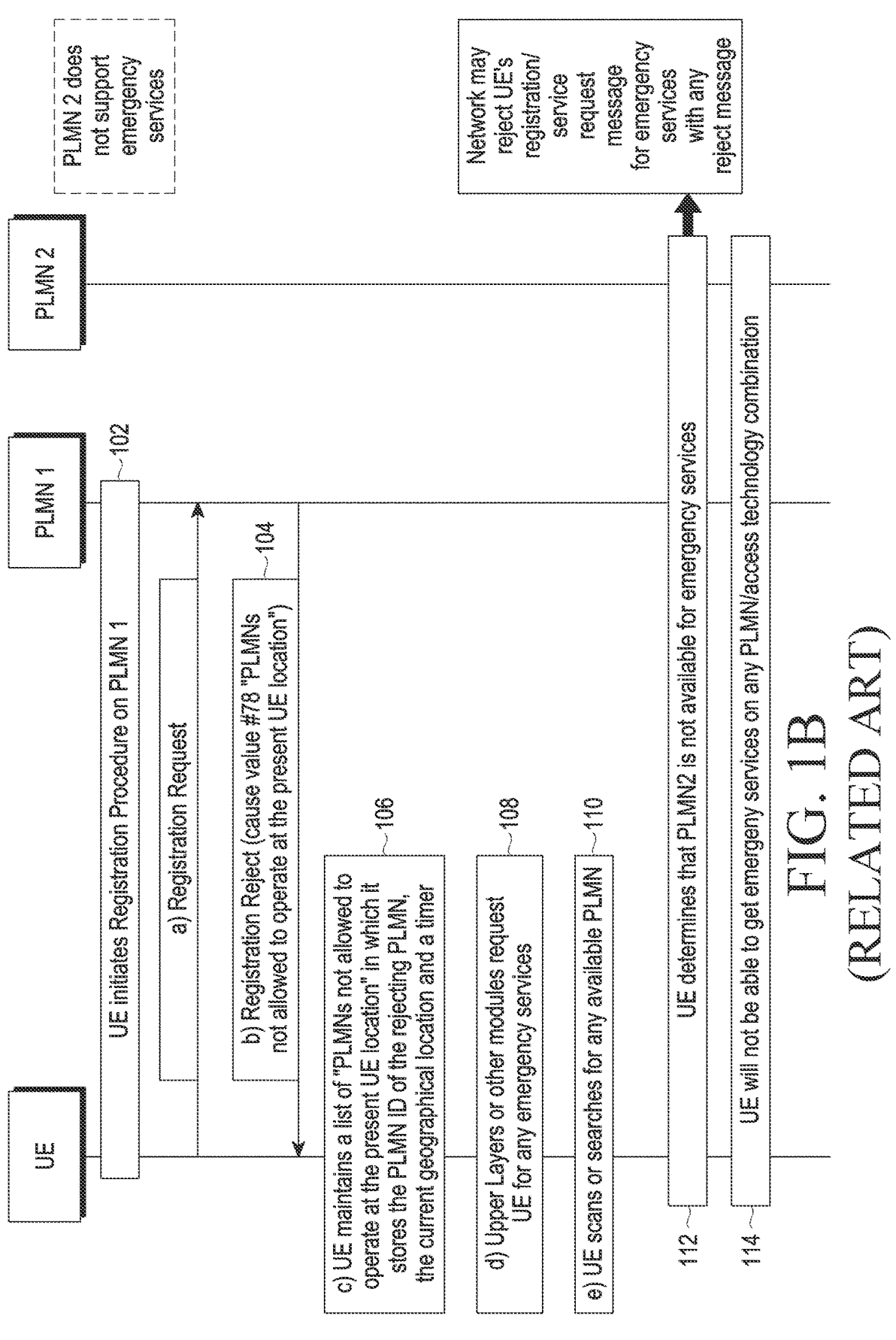
FIG. 1B illustrates a schematic diagram where a UE not gets emergency services on any PLMN/access technology combination, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

It should be noted that elements in the drawings are illustrated for the purposes of this description and ease of understanding and may not have necessarily been drawn to scale. For example, the flowcharts/sequence diagrams illustrate the method in terms of the steps required for understanding aspects of the embodiments as disclosed herein. Furthermore, in terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the present embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the disclosure should be construed to extend to any modifications, equivalents, and substitutes in addition to those which are particularly set out in the accompanying drawings and the corresponding description. Usage of words such as first, second, third, and the like, to describe components/elements/steps is for the purposes of this description and should not be construed as sequential ordering/placement/occurrence unless specified otherwise.

Embodiments herein disclose methods and systems for selecting non-terrestrial networks (NTNs) in communication networks. Embodiments herein disclose methods and systems for selecting non-terrestrial networks (NTNs) in communication networks, wherein a random TN is prioritized over other NTNs. Embodiments herein disclose methods and systems for selecting non-terrestrial networks (NTNs) in communication networks, wherein the scan pattern is changed to accommodate combination of bands, radio access technologies (RATs) and PLMNs. Embodiments herein disclose methods and systems for selecting non-terrestrial networks (NTNs) in communication networks, wherein NTNs and TNs are differentiated from extended NAS and AS timers. Embodiments herein disclose methods and systems for selecting non-terrestrial networks (NTNs) in communication networks, wherein PLMN type, i.e., non-terrestrial network PLMN or terrestrial network PLMN and/or their respective priorities are pre-configured at the UE. Embodiments herein disclose methods and systems for selecting non-terrestrial networks (NTNs) in communication networks, wherein timing advance can be used to identify NTNs. Embodiments herein disclose methods and systems for optimizing/saving battery life when connected to NTN in a remote area.

Embodiments herein disclose a method for handling emergency services in wireless communication, when PLMN is not allowed to operate at the present UE Location. PLMN selection as per 23.122 without registered PLMN (RPLMN) is as follows: the MS selects and attempts registration on any PLMN/access technology combinations, if available and allowable, in the following order: either of the HPLMN (if the EHPLMN list is not present or is empty) or the highest priority EHPLMN that is available (if the EHPLMN list is present); each PLMN/access technology combination in the "user controlled PLMN selector with access technology" data file in the SIM (in priority order); each PLMN/access technology combination in the "operator controlled PLMN selector with access technology" data file in the SIM (in priority order) or stored in the mobile equipment (ME) (in priority order); the other PLMN/access technology combinations with received high quality signal in random order; other PLMN/access technology combinations in order of decreasing signal quality.

In an embodiment, PLMN selection as per 23.122 with RPLMN is as follows: The MS selects and attempts registration on any PLMN/access technology combinations, if available and allowable, in the following order: either the RPLMN or the Last registered PLMN; either the HPLMN (if the EHPLMN list is not present or is empty) or the highest priority EHPLMN that is available (if the EHPLMN list is present); each PLMN/access technology combination in the "user controlled PLMN selector with access technology" data file in the SIM (in priority order); each PLMN/access technology combination in the "Operator Controlled PLMN Selector with Access Technology" data file in the SIM (in priority order) or stored in the ME (in priority order); other PLMN/access technology combinations with received high quality signal in random order; other PLMN/access technology combinations in order of decreasing signal quality.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropocessor unit (MPU), a system on chip (SoC), an integrated circuit (IC), or the like.

The embodiments herein achieve methods and systems for selecting non-terrestrial networks (NTNs) in communication networks. Referring now to the drawings, and more particularly to FIGS. 2 to 4, 5A to 5D, 6, 7, 8A, 8B, 9, 10, 11A, 11B, 12, 13A, 13B, 14A, 14B, and 15, where similar reference characters denote corresponding features consistently throughout the figures, there are shown embodiments.

Figure 2:
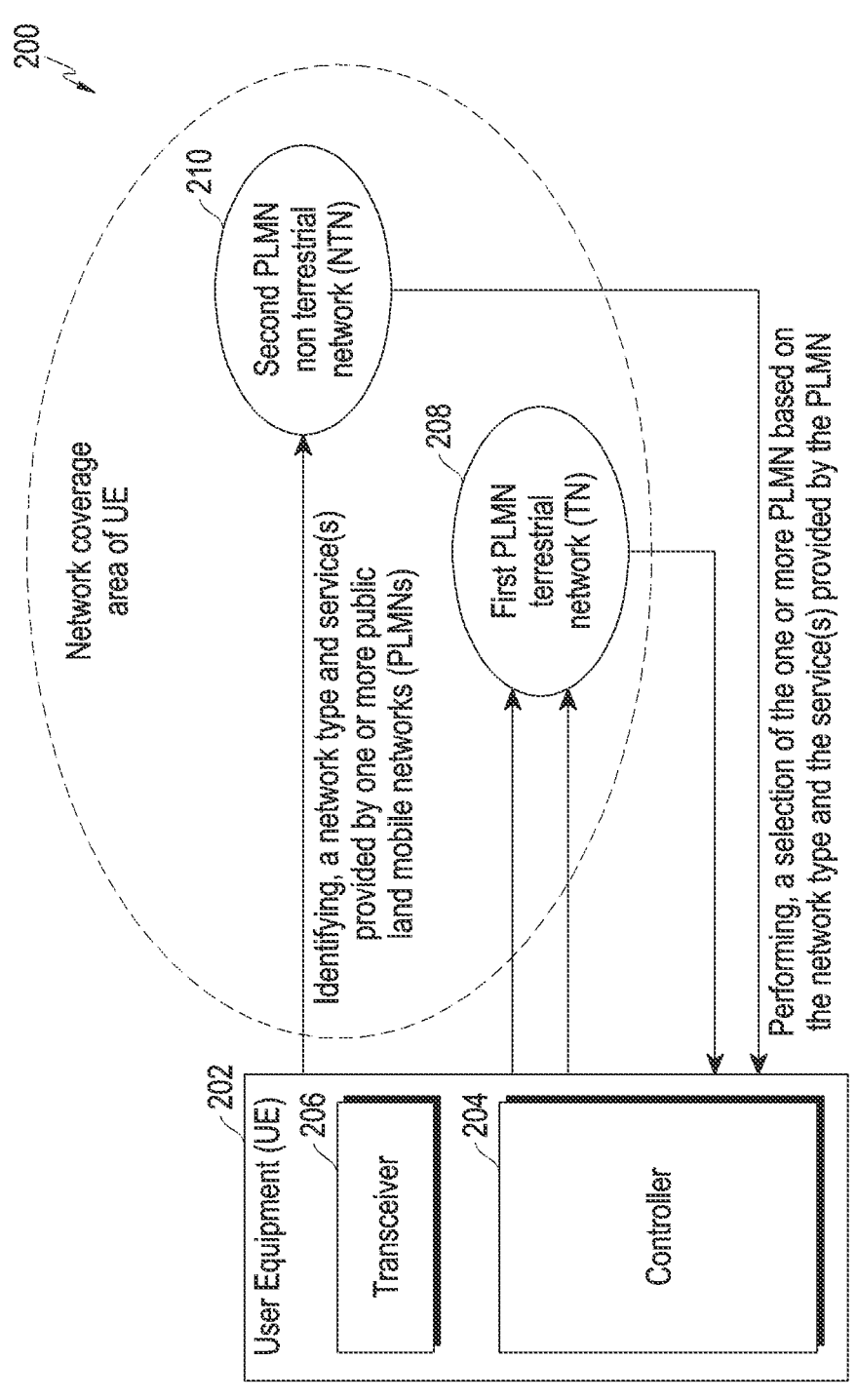
FIG. 2 shows a schematic overview of a wireless network for selection of non-terrestrial networks, according to an embodiment of the disclosure.

FIG. 2 shows a schematic overview of a wireless network for selection of non-terrestrial networks, according to an embodiment of the disclosure.

Referring to FIG. 2, the wireless network 200 may be, for example, but not limited to a fourth-generation wireless network, a fifth-generation wireless network, open radio access network (ORAN) or the like. The wireless network 200 includes one or more UEs 202 and one or more network entities (NE). The network entity may be a PLMN or a stand-alone non-public network (SNPN). The UE 202 may be, for example, but not limited to a laptop, a smart phone, a desktop computer, a notebook, a device-to-device (D2D) device, a vehicle to everything (V2X) device, a foldable phone, a smart television (TV), a tablet, a television, a connected car, an immersive device, an internet of things (IOT) device, or any other device that may communicate using the wireless network.

In an embodiment, the UE 202 comprises a controller 204 and a transceiver 206. The controller 204 communicates to the first PLMN 208 and the second PLMN 210 through the transceiver 206. The wireless network may include, but is not limited to, a plurality of network entities available in a network coverage area of the UE. The first PLMN and second PLMN are used for illustrative purposes only.

In an embodiment, the user equipment (UE) identifies a network type and a service(s) provided by one or more public land mobile networks (PLMNs) available in a network coverage area of the UE. The network type may include, but is not limited to at least one of a terrestrial network (TN) and a non-terrestrial network (NTN). In an embodiment, the terrestrial network (TN) and a non-terrestrial network (NTN) are on separate PLMNs.

In an embodiment the UE 202 performs a selection of the one or more PLMN through the controller 204 based on the network type and the service(s) provided by the PLMN. The UE 202 performs the selection by prioritizing the PLMN based on a number of service(s) provided by the one or more PLMNs. In an embodiment, the UE 202 prioritizes the terrestrial network over the non-terrestrial network, whenever the terrestrial network (TN) becomes available in the network coverage area of the UE. For example, the UE 202 discovers Sx-1, Rx-1 and Rx-2 PLMNs. The UE 202 analyses a PLMN information of the PLMNs discovered. From the PLMN information, the UE determines that Sx-1 belongs to NTN PLMN list, has emergency SMS support (T911), and belongs to the Non-Terrestrial Network. The Rx-1 and the Rx-2 have Voice, SMS, Ecall (E911) and Esms (T911) services and Rx-1 and Rx-2 PLMNs belong to the terrestrial network. The UE 202 decides the priority for UE 202 according to the services provided and the type of network as Rx-1 as the first entity, followed by Rx-2, followed by Sx-1. The UE may select Rx-1 as Rx-1 is a terrestrial network and the number of services provided are more.

Figure 3:
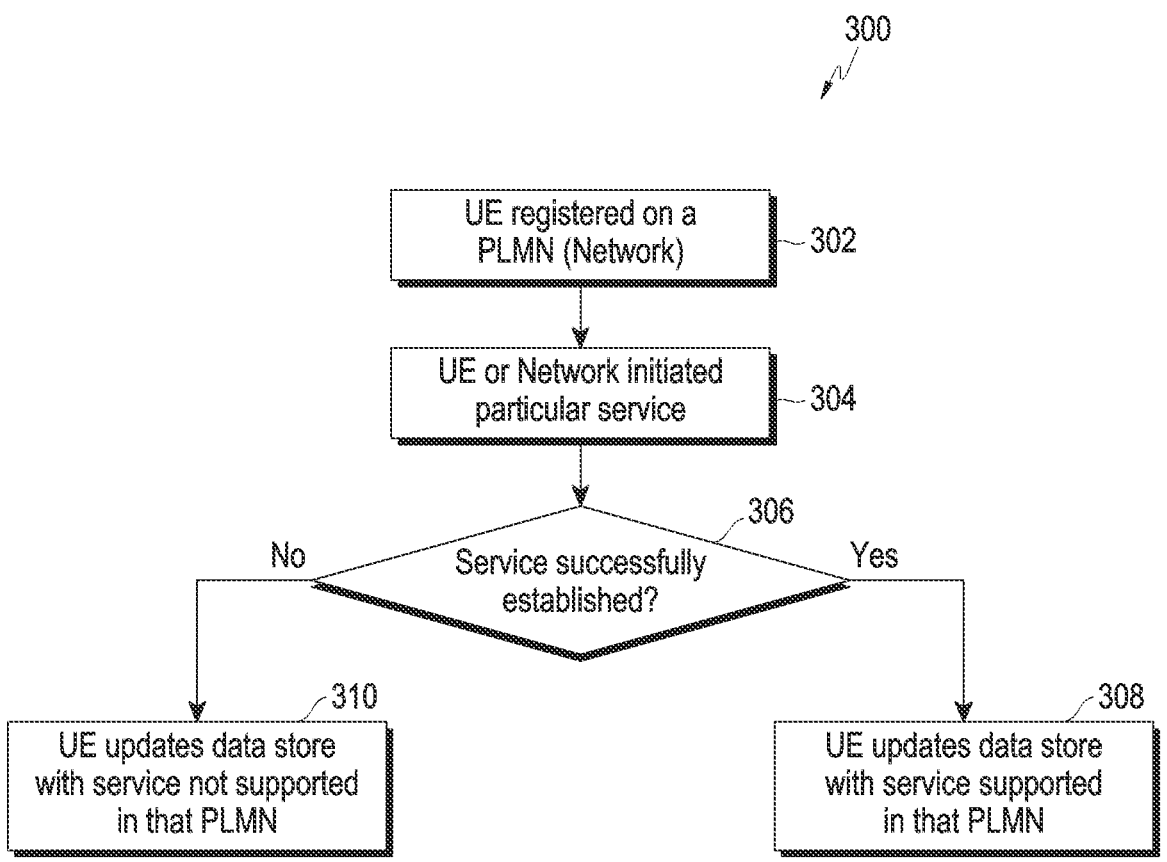
FIG. 3 is a flowchart depicting identifying available networks in a coverage area of a UE, according to an embodiment of the disclosure.

FIG. 3 is a flowchart depicting a method for identifying the available networks in the coverage area of the UE, according to an embodiment of the disclosure.

Referring to FIG. 3, the UE 202 may identify PLMN based on services provided by that PLMN and create a prioritized list of PLMNs. The PLMN providing a higher number of services can be given a higher priority in the list of PLMNs. The UE identifies the services provided by at least one of a previous registration over a particular PLMN and a crowd sourced information for all PLMNs. Here service refers to but not limited to a voice call support, messaging services, video call support, emergency calling services, emergency messaging services, services identified for a particular application (network slice support), and the like.

In an embodiment, the UE 202 identifies the PLMNs by exhaustive or applicable scans available in the network coverage area of the UE 202. In an embodiment, the UE 202 may update a data store based on service availability optionally with network granularity; for example, tracking area code, cell id, frequency, bands, PLMN id, Location details and service details. The UE 202 may identify the services and update the data store according to embodiments as disclosed herein. At operation 302, the UE 202 registers on the PLMN available in the network coverage area of the UE 202. At operation 304, the UE 202 initiates a service on the PLMN; for example, voice call, paging for voice, and so on. At operation 306, the UE 202 checks whether the service has been successfully established and the service has optionally ended successfully. At operation 308, if the service establishment and the usage was successful, the UE 202 may update the data store with that particular service supported information for the respective PLMN. At operation 310, if service establishment or usage was unsuccessful, the UE 202 may update the data store with that particular service not supported information for the respective PLMN. For example, the UE 202 registers with a PLMN Rx-1. The UE 202 tries to establish a service (e.g., voice call service, SMS service, ESMS service, video calling service, and so on) over Rx-1. The UE 202 successfully establishes the service over Rx-1 and also the established service(s) is successfully ended. The UE 202 updates the data store with the service supported information for Rx-1, i.e., Rx-1 supports voice call service, SMS service and ESMS service.

The various actions in method 300 may be performed in the order presented, in a different order or simultaneously. Further, in some embodiments, some actions listed in FIG. 3 may be omitted.

In an embodiment, the service support information for the PLMNs available in the network coverage area of the UE 202 may be optionally configured or pre-configured by the network entity. In an embodiment, the data store may reside in the UE 202 or on any server (not shown).

TABLE 7

| PLMN | Supported RAT | Granularity | Provided Services | Type of Network | PLMN Priority |
|------|------|------|------|------|------|
| PLMN-A | NR, LTE, 3G, 2G | TAC-1, TAC-2 | Voice Call over NR, Message Service, Video Call over NR, Emergency Call, Emergency Messaging, Data Service over NR | Terrestrial Network | 1 |
| PLMN-B | LTE, 3G, 2G | Cell id -1, Cell Id-N | Voice Call over LTE, Emergency Call, Data Service over LTE, Emergency Messaging | Non-Terrestrial Network | 2 |
| SX-1 | Satellite | All | Voice Call, Emergency Call, Messaging, Emergency Messaging | Non-Terrestrial Network | 3 |
| SX-2 | Satellite | All | Emergency Messaging | Non-Terrestrial Network | 4 |

Table 7 shows an example of a PLMN priority list in the data store with the service information of the available PLMNs in the network coverage area of the UE 202. Upon determining the service information of the PLMNs in the network coverage area, the UE 202 may follow the PLMN priority column irrespective of any other PLMN priority list to decide on which PLMN, the UE 202 should try to register from the available PLMN list.

In an embodiment, if the UE 202 does not have any stored service information for a particular PLMN, the UE 202 may follow an existing configured or pre-configured priority list, e.g., OPLMN list to decide the PLMN priority.

In an embodiment, the UE 202 may also decide service availability by registering on each PLMN available in the network coverage area and trigger required services to check for the service information, if the service information for that PLMN is not pre-configured in UE 202.

Figure 4:
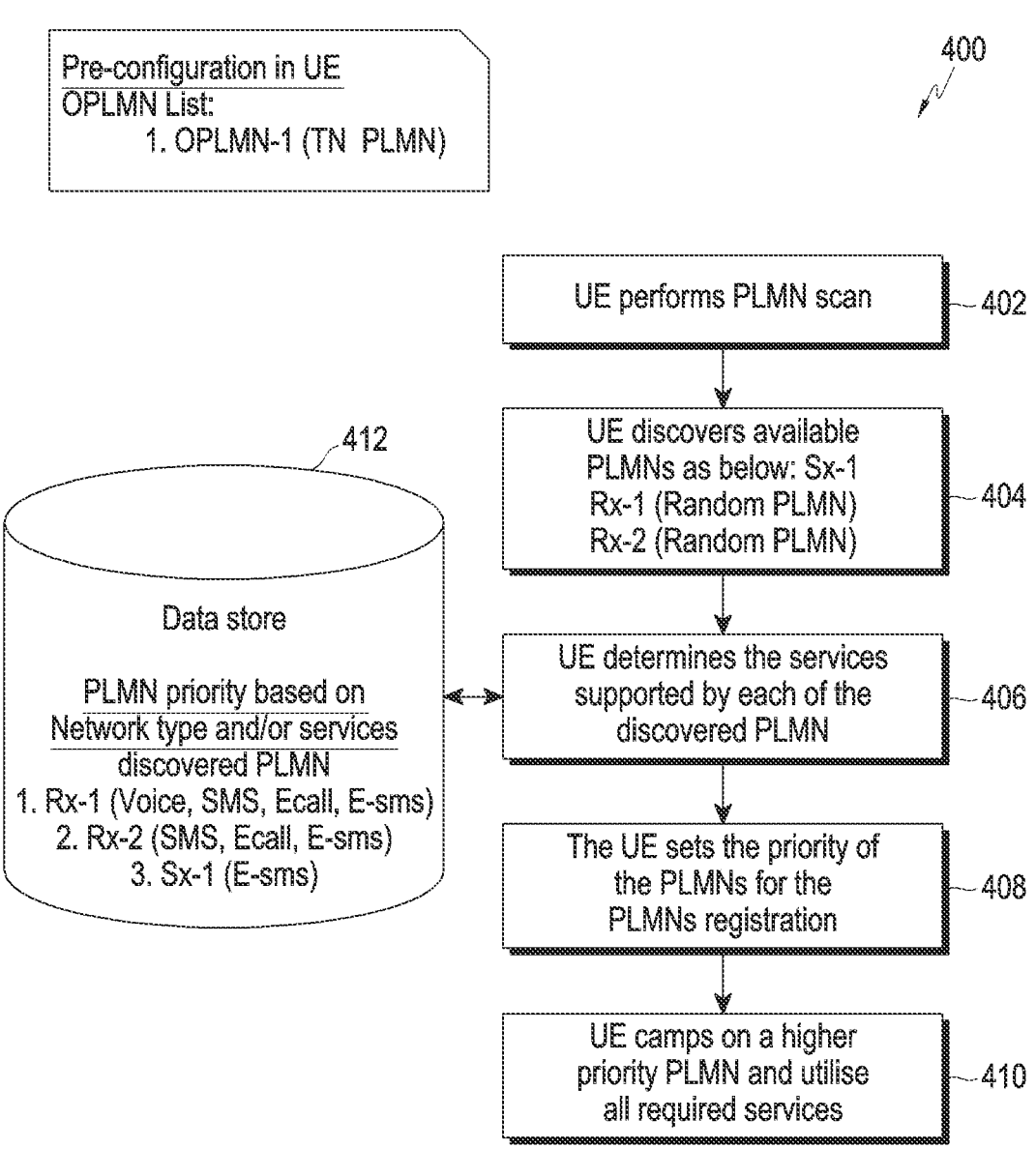
FIG. 4 illustrates a flowchart showing an example of a UE prioritizing a PLMN based on service information, according to an embodiment of the disclosure.

FIG. 4 is an example flowchart showing an example process for prioritizing the UE the PLMN based on the service information, according to an embodiment of the disclosure.

Referring to FIG. 3, in a method 400, at operation 402, the UE triggers a PLMN selection procedure in the network coverage area. At operation 404, the UE discovers 3 PLMNs—Sx-1, Rx-1 and Rx-2. At operation 406, the UE 202 determines the service support information for each of the PLMNs found in the network coverage area. The UE 202 determines from the service information stored in the data store 412 that Sx-1 has only emergency SMS support (T911) and the system belongs to a non-terrestrial network, optionally Sx-1 is in OPLMN list. The UE 202 also determines that Rx-1 and Rx-2 have services of voice, SMS, Ecall (E911) and Esms (T911) and Rx-1 and Rx-2 belong to the terrestrial network. At operation 408, the UE 202 sets the priority for the PLMNs registration, wherein Rx-1 is the top priority, followed by Rx-2, and then followed by Sx-1. At operation 410, the UE 202 may select Rx-1 and camp on Rx-1 to avail all services of Rx-1. The various actions in method 400 may be performed in the order presented, in a different order or simultaneously. Further, in some embodiments, some actions listed in FIG. 4 may be omitted.

Figure 5A:
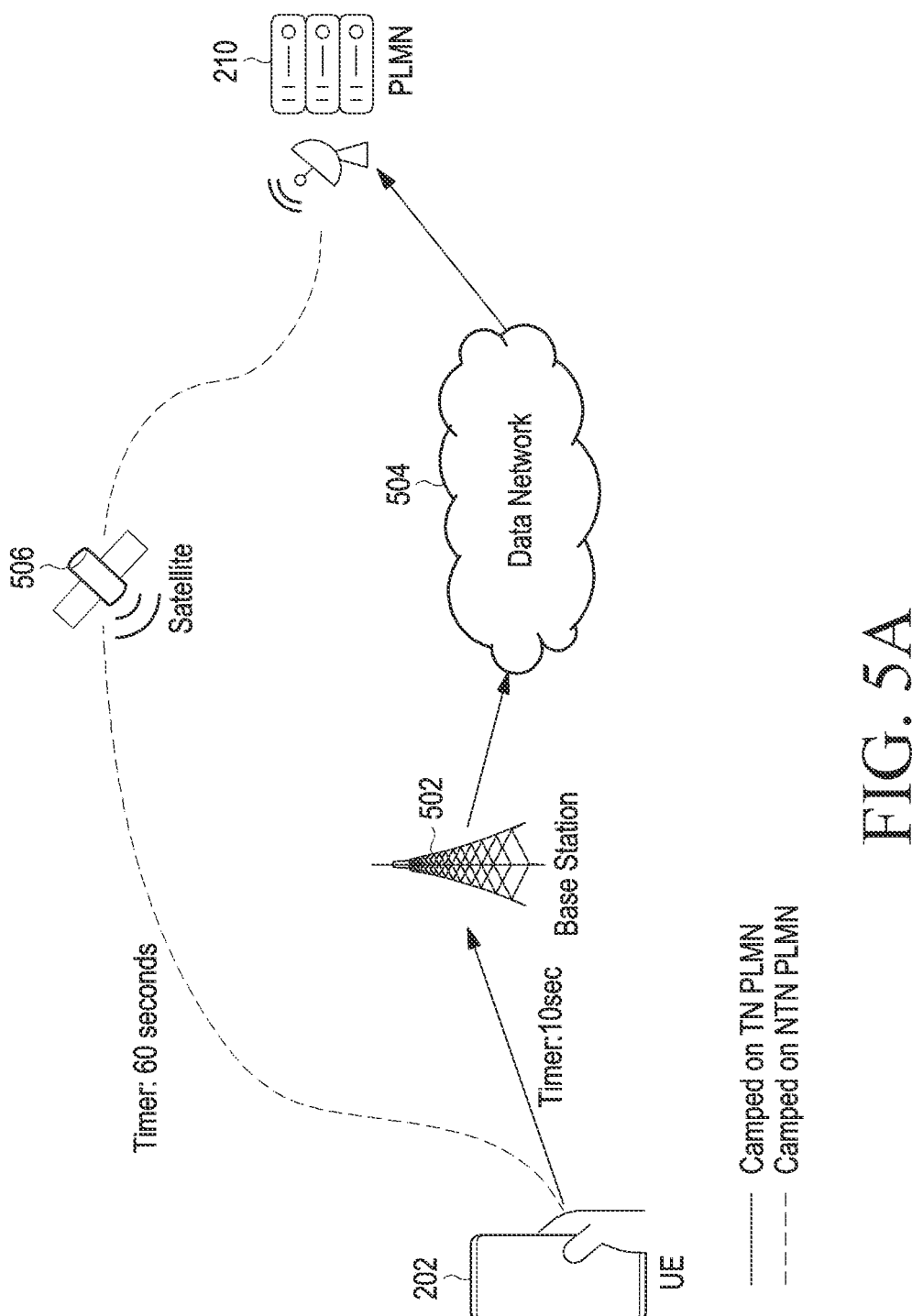
FIG. 5A illustrates a schematic diagram showing an example for identifying terrestrial and non-terrestrial network type, according to an embodiment of the disclosure.

FIG. 5A illustrates a schematic diagram showing an example for identifying terrestrial and non-terrestrial network type, according to an embodiment of the disclosure.

Referring to FIG. 5A, the UE 202 identifies the network type (terrestrial network/non-terrestrial network) using configured network access stratum (NAS) timer or access stratum (AS) timer values. Generally, NAS or AS timers configured for non-terrestrial networks have higher values of transmission and receiving times (e.g., 2 times or 3 times more than that of terrestrial networks) compared to respective timer values configured in terrestrial networks. A wireless signal takes a longer path to reach in case of non-terrestrial networks compared to terrestrial networks, therefore the timer values of NTNs are higher.

In an embodiment, the UE 202 may also determine the altitude of the non-terrestrial network (e.g., low earth orbit (LEO) satellites, medium earth orbit (MEO) satellites, geostationary equatorial orbit (GEO) satellites, and so on).

In an embodiment, the UE 202 may have been pre-configured (e.g., during manufacturing time or embedded in USIM or embedded SIM (ESIM)) or configured (over the air interface, e.g., using SIM refresh command or any non-access stratum (NAS) or access stratum (AS) message, and the like) with the list of satellite PLMNs optionally with satellite orbit information such as, e.g., low earth orbit (LEO) satellites, medium earth orbit (MEO) satellites, geostationary equatorial orbit (GEO) satellites, and so on.

In an embodiment, the UE 202 may utilise a threshold value to compare the timer values of the PLMN networks in order to determine whether a network is a terrestrial network or a non-terrestrial network. If all the configured timers are above the determined threshold value, then the UE 202 may consider the network as a non-terrestrial network. If the configured timers are below the determined threshold value, then the UE 202 may consider the network as a terrestrial network.

Figure 5B:
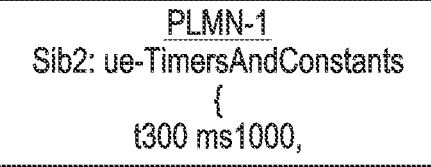
FIG. 5B shows an example for identifying terrestrial and non-terrestrial network type, according to an embodiment of the disclosure.
Figure 5B:
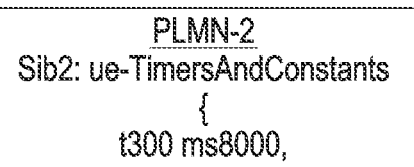

FIG. 5B shows an example for identifying terrestrial and non-terrestrial network types, according to an embodiment of the disclosure.

For example, considering a T300 timer, the T300 timer value for the terrestrial network may range from 1000 ms to 2000 ms. If the value of the T300 timer is going above 2000 ms, then the UE may consider the network as the non-terrestrial network.

Referring to FIG. 5B, the UE 202 finds Sib2 from two different networks; a first Sib2 for PLMN-1 configured T300 timer as 1000 ms and a second Sib2 belongs to PLMN-2 where the value of T300 timer is broadcasted as 8000 ms. In this case, the UE 202 may determine PLMN-1 as the terrestrial network and PLMN-2 as the non-terrestrial network.

Figure 5C:
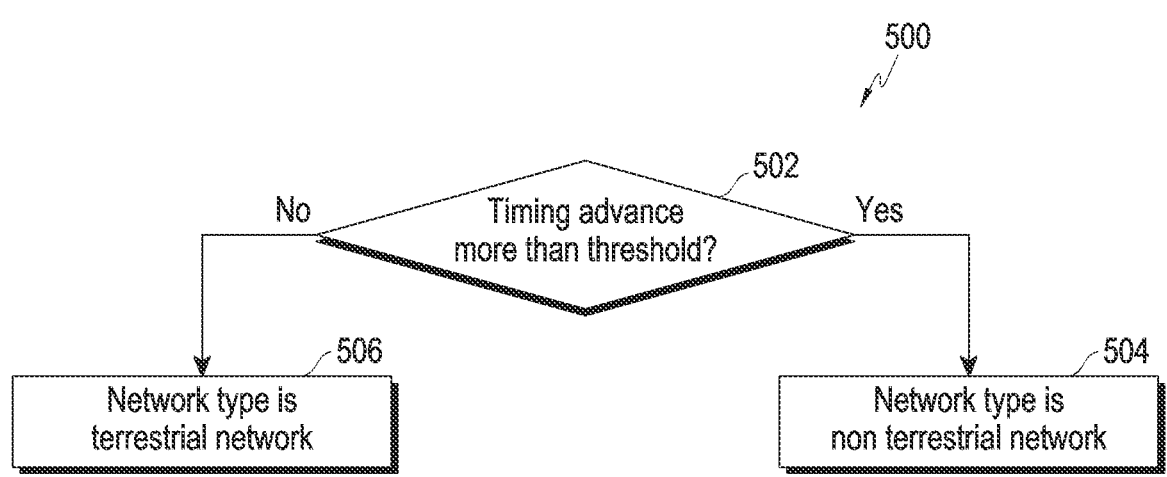
FIG. 5C is a flowchart depicting an example process for identifying terrestrial and non-terrestrial network type using timing advance, according to an embodiment of the disclosure.

FIG. 5C is a flowchart depicting an example process for identifying terrestrial and non-terrestrial network type using timing advance, according to an embodiment of the disclosure.

Referring to FIG. 5C, the network keeps measuring the time difference between physical uplink shared channel (PUSCH), physical uplink control channel (PUCCH), and sounding reference signal (SRS) reception and a sub frame time. In long term evolution (LTE), transmissions are organized into radio frames of 10 ms each. Each frame is divided into ten equally sized subframes. The duration of each subframe is 1 ms. The network may send a 'Timing Advance' command to the UE 202 to change the PUSCH and PUCCH transmission in order to make it aligned with the sub frame timing at the network side. At operation 502, the UE 202 may compare the timing advance of the available PLMN with a threshold value of timing advance. At operation 504, if the timing advance value is more than the threshold value of timing advance, then the UE 202 determines that the available PLMN is the non-terrestrial network. At operation 506, if the timing advance value is less than the threshold value of timing advance, then the UE 202 determines that the available PLMN is the terrestrial network. The various actions in a method 500 may be performed in the order presented, in a different order or simultaneously. Further, in some embodiments, some actions listed in FIG. 5C may be omitted.

In an embodiment, for the non-terrestrial network, the timing advance may be higher compared to the terrestrial network as the signal covers a longer path compared to the terrestrial network. In an embodiment, the UE 202 may identify the network type based on a timing advance value, wherein the timing advance value can be configured as a part of media access control-control elements (MAC-CE), and can be used to control uplink signal transmission timing. If the PUSCH, PUCCH, and SRS arrive at the network too early, the network sends a timing advance command to the UE 202 saying "Transmit your signal a little bit late". If PUSCH, PUCCH, and SRS arrives at the network too late, the network sends a timing advance command to the UE 202 saying "Transmit signal a little bit early". Considering the delay to reach any signal from the UE 202 to the network will be more in case of the non-terrestrial network as compared to the terrestrial network, the UE 202 may expect a higher value of timing advance configured when in non-terrestrial networks as compared to terrestrial networks. So, if the UE 202 determines the timing advance configured in a network is above a pre-defined value, then the UE 202 may consider the network as a non-terrestrial network, otherwise the UE 202 may consider the network as a terrestrial network.

Figure 5D:
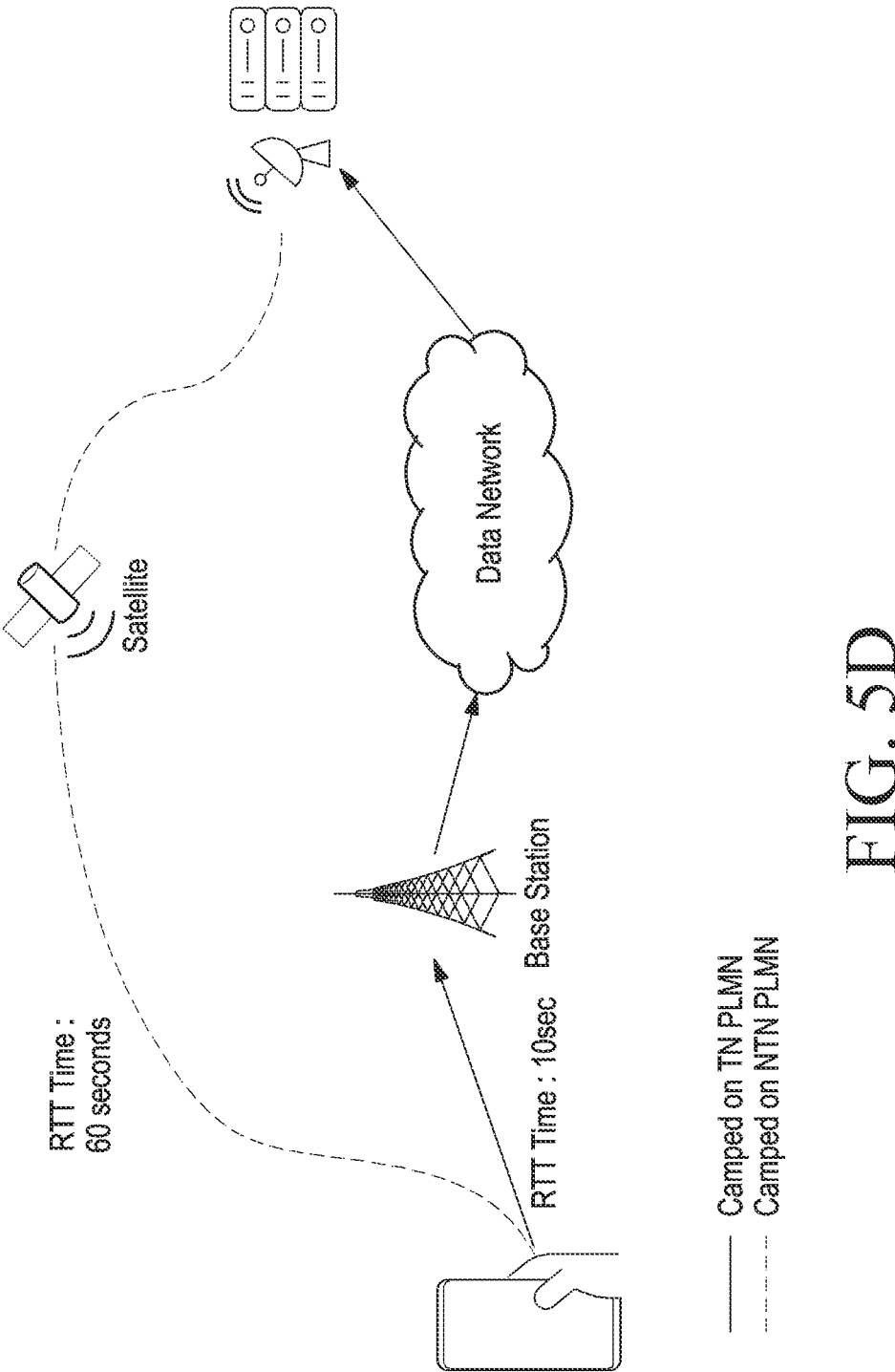
FIG. 5D shows a schematic diagram of an example for identifying terrestrial and non-terrestrial network type using round trip time, according to an embodiment of the disclosure.

FIG. 5D shows a schematic diagram of an example for identifying terrestrial and non-terrestrial network types using round trip time, according to an embodiment of the disclosure.

Referring to FIG. 5D, the UE 202 may identify the network type based on round trip time (RTT) of the network. The information of the RTT may optionally be stored in the data store 412 managed by the UE 202 to avoid repeatedly performing checking of the RTT time of a particular network at a particular location and a particular time.

In an embodiment, whenever the UE 202 finds a network or PLMN for which the UE 202 does not have the network type; i.e., the UE 202 does not find the service information of the found PLMN from the stored information or the pre-configured information. The UE 202 may try registering over the found PLMN network and measure the RTT. In an embodiment, after measuring RTT, the UE 202 may optionally store the RTT information for the particular PLMN at the particular location and optionally, for a particular time. With the RTT information, the UE 202 may identify a network type. The UE 202 may compare the measured RTT with a threshold RTT. In case, for a network or PLMN, if the measured RTT is more than the threshold RTT, the UE 202 may consider the PLMN or network as a non-terrestrial network. If the measured RTT is lesser than the threshold RTT, the UE 202 may consider the network as the terrestrial network. Based on the network type, the UE 202 may apply cell or PLMN selection priority. In an embodiment, the terrestrial network may be given higher priority than the non-terrestrial network.

In an embodiment, the network (PLMN) might broadcast the network type in any of an information element (IE) from any one of a broadcasted message. The broadcasted message may include, but is not limited to, master information block (MIB) and a series of system information blocks (SIB). The information from the broadcasted message may aid the UE 202 in deciding the network type at the time. The UE 202 may use the information during the PLMN or cell selection/cell re-selection process.

In an embodiment, the network may also include the network type information in any one of NAS or AS signalling message in any one of the IEs related to the PLMN. As an example, the network may include the network type information in the network name or any other IE of evolved packet system (EPS) mobility management (EMM) status message. The UE 202 may use the EMM status message during PLMN or cell selection/cell re-selection process.

In an embodiment, the network type is pre-configured based on each PLMN. The UE 202 stores the pre-configured network type per PLMN. The network information may be stored in a mobile equipment (ME), a universal subscriber identity module (USIM), an embedded subscriber identity module (ESIM) and any other storage type in the UE 202. The network type configuration may also be updated using an over the air (OTA message); for example, a SIM refresh command.

Figure 6:
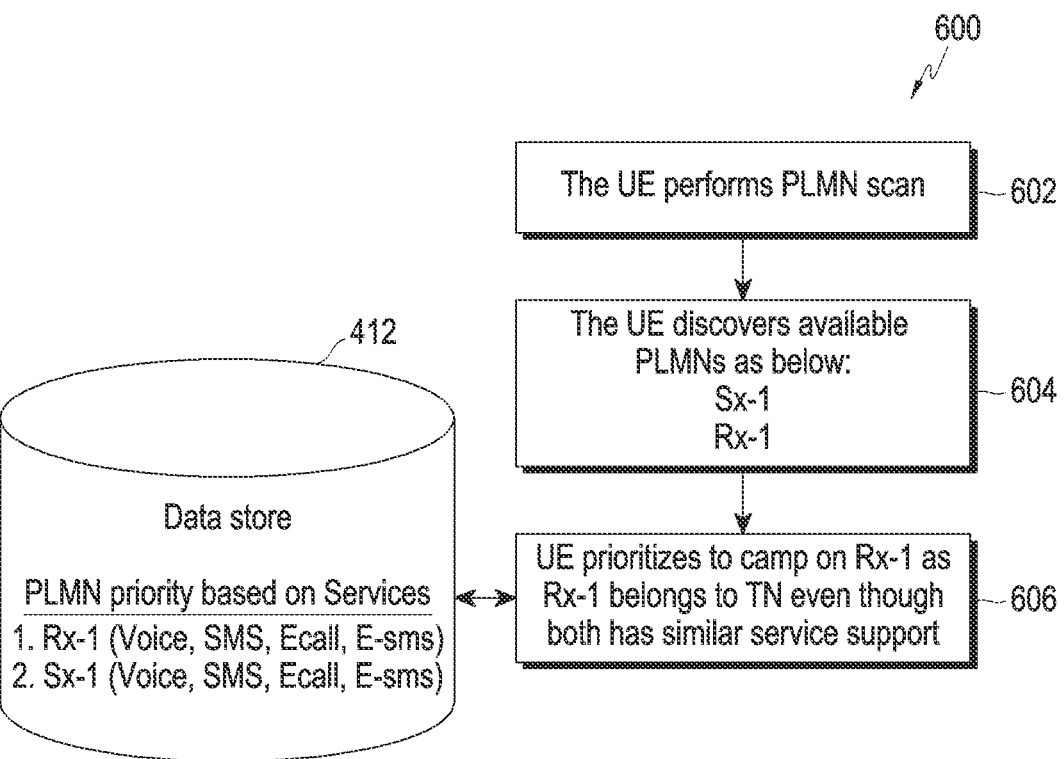
FIG. 6 is a flowchart depicting an example process for selecting a network based on a network type, according to an embodiment of the disclosure.

FIG. 6 is a flowchart showing an example process for selecting a network based on the network type, according to an embodiment of the disclosure.

Referring to FIG. 6, in a method 600, at operation 602, the UE 202 initiates the PLMN selection procedure. At operation 604, the UE 202 discovers Sx-1 and Rx-1 PLMNs. From information stored in the data store 412, the UE 202 determines that both the PLMNs (Sx-1 and Rx-1) support similar required services, e.g., voice call, emergency call (E911), emergency SMS (T911), SMS service, and the like. The UE 202 determines the Rx-1 as a terrestrial network and the Sx-1 as non-terrestrial network from one of the identification techniques. At operation 606, the UE 202 prioritises Rx-1 as Rx-1 belongs to the terrestrial network over Sx-1 as Sx-1 belongs to non-terrestrial network. The UE 202 selects Rx-1 and avails the services. The various actions in method 600 may be performed in the order presented, in a different order or simultaneously. Further, in some embodiments, some actions listed in FIG. 6 may be omitted.

Figure 7:
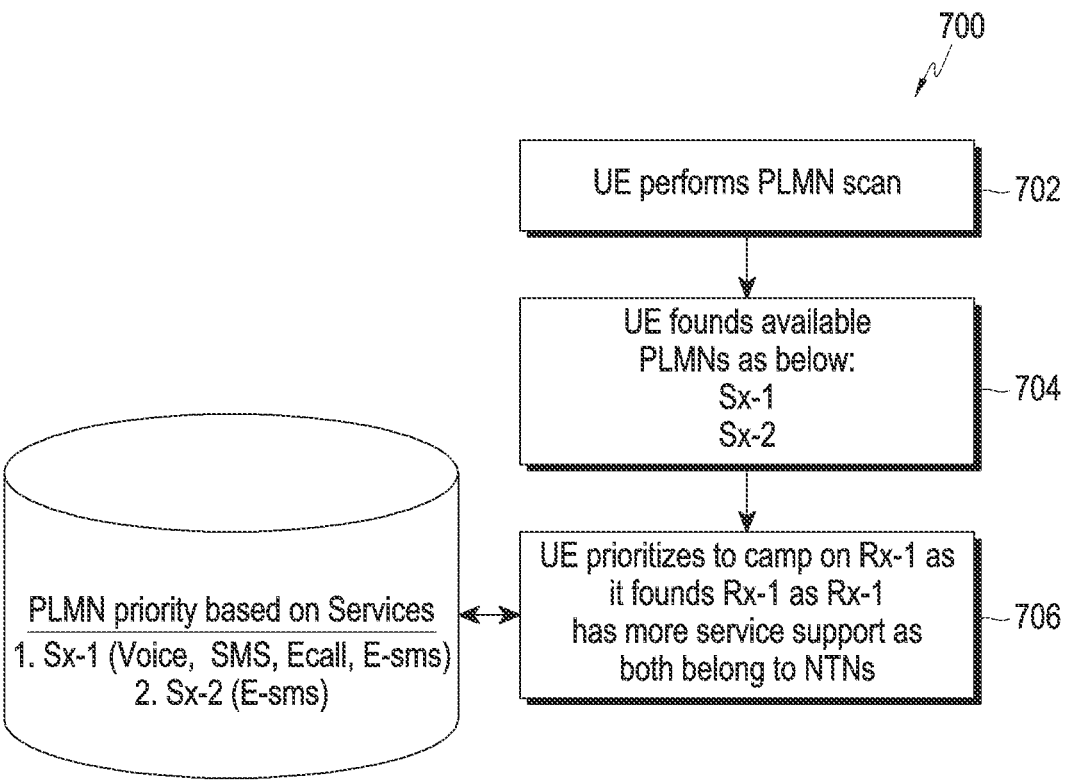
FIG. 7 is a flowchart depicting an example process for selecting a network based on a network type, according to an embodiment of the disclosure.

FIG. 7 is a flowchart showing an example process for selecting a network based on the network type, according to an embodiment of the disclosure.

Referring to FIG. 7, in a method 700, at operation 702, the UE 202 initiates the PLMN selection procedure. At operation 704, the UE 202 determines Sx-1 and Sx-2 PLMNs. From information stored in the data store 412, the UE 202 determines that both the PLMNs, Sx-1 and Sx-2 belong to the non-terrestrial network. Also, the UE 202 determines from the stored information that Sx-1 supports more required services, as compared to Sx-2. For example, Sx-1 supports voice, SMS, Ecall (E911), Esms (T911), and Sx-2 supports Esms (T911). At operation 706, the UE 202 prioritises Sx-1 over Sx-2 as the PLMN Sx-1 has more services than Sx-2 and none of the PLMNs belong to terrestrial networks, and no other PLMN networks belonging to a terrestrial network is found in the area of the UE 202 at the given point of time. The various actions in method 700 may be performed in the order presented, in a different order or simultaneously. Further, in some embodiments, some actions listed in FIG. 7 may be omitted.

Figure 8A:
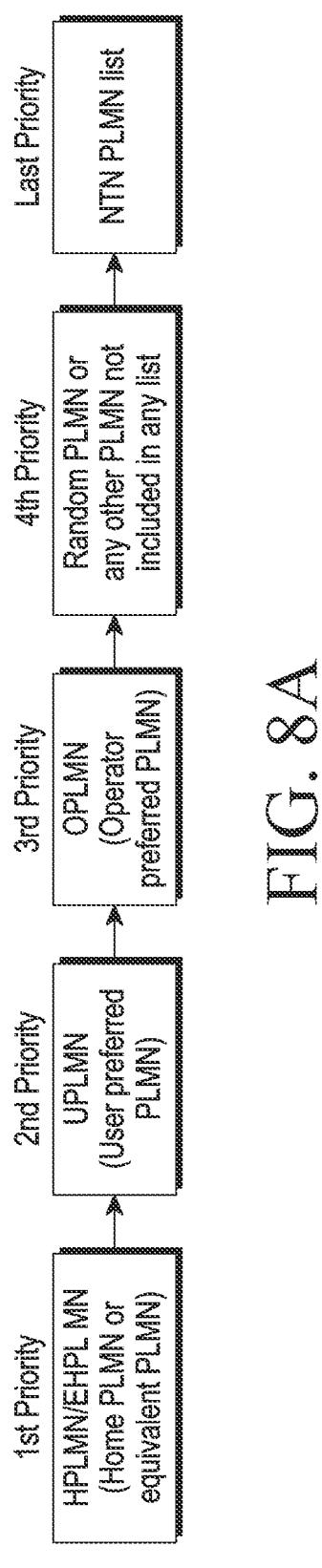
FIG. 8A shows an example block diagram of a PLMN priority list, according to an embodiment of the disclosure.

FIG. 8A shows an example block diagram of the PLMN priority list, according to an embodiment of the disclosure.

Referring to FIG. 8A, the UE 202 may be configured with a set of PLMNs which belong to the non-terrestrial network as a separate PLMN list. The UE 202 may use the separate set of PLMN list as the least priority PLMNs for the UE 202 to register on. In an embodiment, the UE 202 may also update and maintain the separate list of PLMNs that belong to non-terrestrial networks after identifying a network type as non-terrestrial network according to at least one of the network type identification techniques disclosed in the embodiments disclosed in FIGS. 5A to 5D above. In an embodiment, the network may also update the set of PLMNs of the non-terrestrial network as a part of steering of roaming (SoR) update procedure, an existing non-access stratum or access stratum procedure and a new procedure, e.g., changing configuration of UE in some proprietary way (e.g., updated by server over the air, and the like) optionally based on a visited country, location, and the like.

Referring to FIG. 8A, in an example scenario considering new list of NTN PLMN name is "NTN PLMN list", the UE may consider the PLMN selection priority as: HPLMN/EHPLMN should be considered as highest priority, followed by UPLMN, then followed by OPLMN, followed by random PLMN list and then UE may consider NTN PLMN list as the last priority.

Figure 8B:
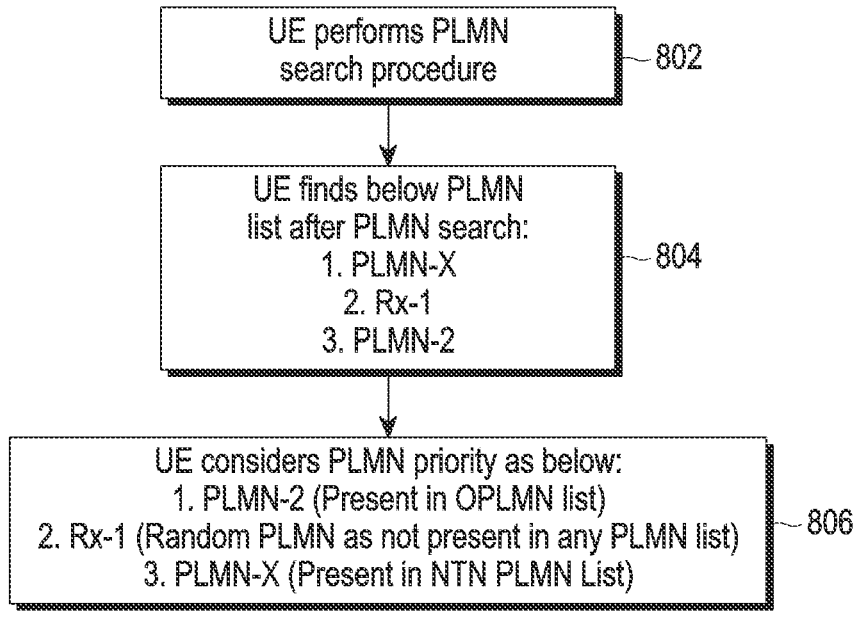
FIG. 8B shows an example flowchart showing a method to maintain a separate PLMN priority list, according to an embodiment of the disclosure.

FIG. 8B is an example flowchart showing a method for maintaining a separate PLMN priority list, according to an embodiment of the disclosure.

Referring to FIG. 8B, in a method 800, consider a PLMN configuration in the UE 202 in the sequence of the priority list as in FIG. 8A is given as:

HPLMN: PLMN-1,

OPLMN: PLMN-2, PLMN-3

NTN PLMN List: PLMN-X, PLMN-Y.

At operation 802, the UE 202 performs a PLMN search in the network coverage area based on existing PLMN search trigger criteria. At operation 804, the UE 202 discovers a set of PLMNs in the network coverage area. The set of PLMNs found may be as follows:

PLMN-x

Rx-1

PLMN-2

At operation 806, the UE 202 may consider the PLMN selection priority as below, according to the PLMN selection priority list:

PLMN-2

Rx-1

PLMN-X

In an embodiment, the UE 202 considers PLMN-2 as the highest priority, as PLMN-2 is in the OPLMN list. The UE 202 considers Rx-1 as lower priority than PLMN-2 and higher priority than PLMN-X, as Rx-1 is not in any of the PLMN lists in the UE 202 and hence the UE will consider Rx-1 as a random PLMN. The UE 202 considers PLMN-X as a last priority as it belongs to the "NTN PLMN List". The various actions in method 800 may be performed in the order presented, in a different order or simultaneously. Further, in some embodiments, some actions listed in FIG. 8B may be omitted.

Figure 9:
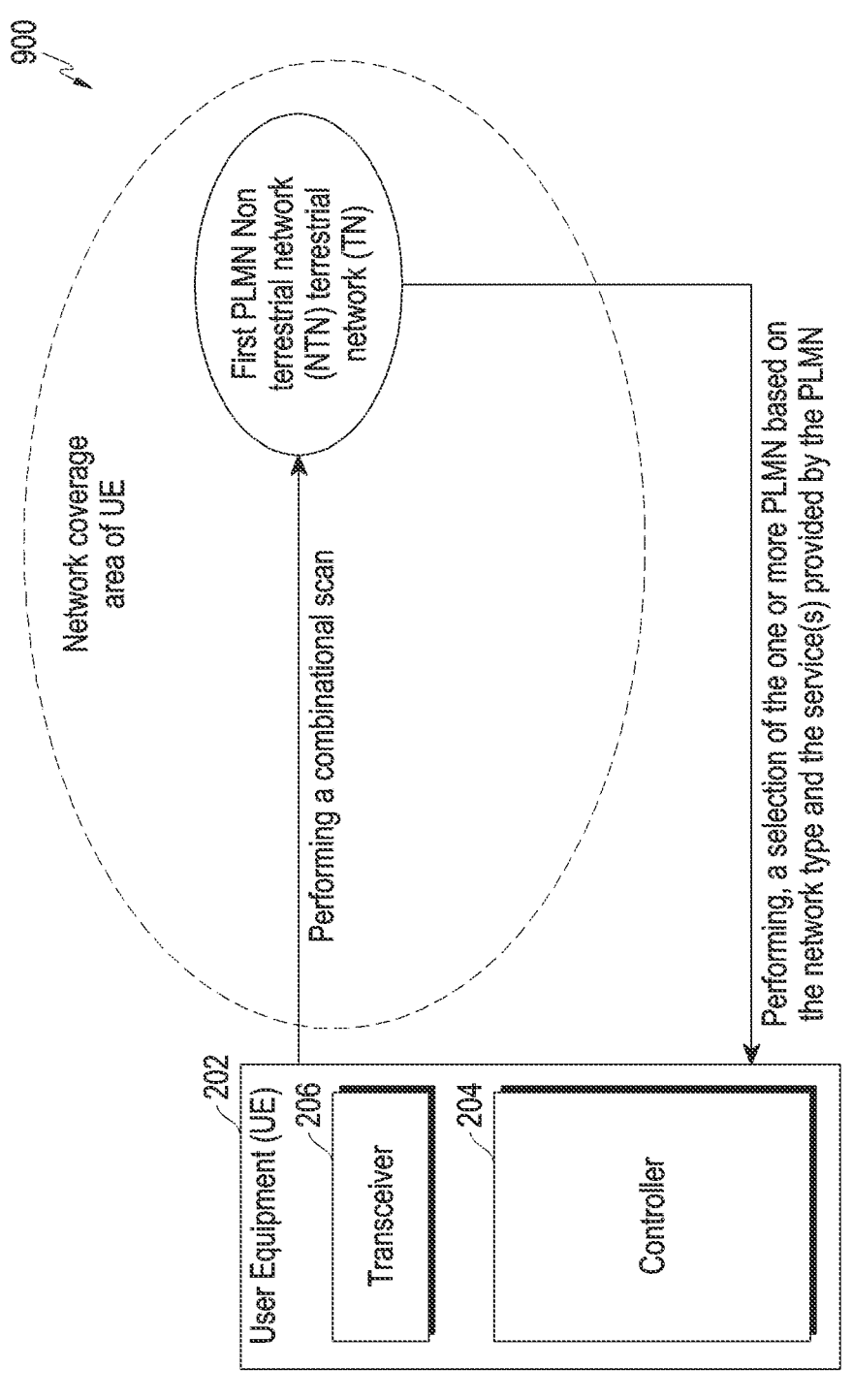
FIG. 9 shows a block diagram of a wireless network for selection of non-terrestrial networks, according to an embodiment of the disclosure.

FIG. 9 shows a block diagram of a wireless network for selection of non-terrestrial networks, according to an embodiment of the disclosure.

Referring to FIG. 9, in a block diagram 900, the UE 202 comprises the controller 204 and the transceiver 206. The controller 204 communicates to the first PLMN 208 through the transceiver 206. The wireless network may include, but is not limited to a plurality of network entities available in a network coverage area of the UE 202. The first PLMN 208 is deployed over a terrestrial network as well as the non-terrestrial network at separate frequency bands. For example, a PLMN-1 in the network coverage area of the UE 202 is deployed on the terrestrial network having frequency bands b3, b41, and b66, and the UE 202 is also deployed on a non-terrestrial network at a frequency band of bx.

In an embodiment, the UE 202 identifies the available PLMNs, and network type and service(s) provided by the available PLMNs in the network coverage area of the UE 202. As the available PLMNs in the network coverage area support the terrestrial network at a first frequency and a non-terrestrial network at a second frequency, a combinational scan is performed by the UE 202. In the combinational scan, the UE 202 identifies the available PLMNs in the network coverage area and the network type supported by each identified PLMN. The UE 202 also identifies the frequency band and the radio access technology (RAT) of the PLMNs on which the PLMN supports a particular network type (i.e., the terrestrial network and the non-terrestrial network). The UE 202 also identifies the service(s) provided by the identified PLMNs for each of the network type technology (RAT) of the PLMNs on which the PLMN supports a particular network type (i.e., the terrestrial network and the non-terrestrial network). For example, the UE 202 identifies that the network has deployed a PLMN-A on band bx for the non-terrestrial network, and the same PLMN-A is being used by the network for the terrestrial network on bands b3, b41 and b66, using the combinational scan.

In an embodiment, the UE 202 optimizes scan pattern(s) by segregating the identified PLMNs based on the frequency band, and the service(s) provided according to the network type of the identified PLMNs. For example, if UE finds out for P-1 PLMN $4^{th}$ generation (4G) RATs at that location or TAI-1 or frequency X at that location will provide non-terrestrial network, whereas 5G RAT for the same PLMN or TAI-2 at that location or frequency Y at that location belongs to terrestrial network, then UE may prioritise 5G RAT at that location or TAI-2 scan at that location or frequency Y should be scanned before frequency X.

In an embodiment, the UE 202 groups the frequency band, and the service(s) provided for a particular PLMN according to the network type as a group. For example, the UE 202 identifies that the network has deployed a PLMN-A on band bx for the non-terrestrial network and the same PLMN-A on bands b3, b41, and b66 is being used by the network for the terrestrial network using the combinational scan. The UE 202 may group the PLMN-A and band bx combination as the non-terrestrial network group, and the PLMN-A, and bands b3, b41, and b66 as the terrestrial network group. After deciding the network group, the UE 202 may choose its priority of group selection rather than the PLMN selection. Also, during PLMN selection/re-selection, the UE may consider only those bands which fall into at least one group.

In an embodiment the UE 202 determines a priority of the group based on the network type and the service(s) provided by the PLMN. The UE 202 prioritizes the PLMN based on a number of service(s) provided by the one or more PLMNs. In an embodiment, the UE 202 prioritizes the group for the terrestrial network over the group for the non-terrestrial network, whenever the group for the terrestrial network becomes available in the network coverage area of the UE 202.

For example, if the network has deployed PLMN-A having band bx combination for non-terrestrial network and the same PLMN-A having bands b3, b41 and b66 for the terrestrial network. The UE 202 may group PLMN-A band bx, as the non-terrestrial network group and PLMN-A band b3, b41, and b66 as terrestrial network group. The UE 202 chooses the terrestrial network group as higher priority and camp on b3 for PLMN-A. Also, during the cell selection/re-selection, the UE 202 considers b3, b41 and b66 bands; i.e., the UE 202 considers only the frequency bands which belong to the same group.

In an embodiment, the UE 202 may store the information about the PLMNs with the respective bands for the network type in the data store 412. In an embodiment, the UE 202 may pre-configure the bands and PLMN combination and may use the data store 412 to get the information. In an embodiment, the UE 202 may also consider RAT(s) while deciding the priority of the group.

TABLE 8

| PLMN List | | |
|---|---|---|
| PLMN A | Terrestrial Network Group-1 | b3, b41, b66 |
| PLMN B | Terrestrial Network Group-2 | b3, b5, b66 |
| PLMN A | Non-Terrestrial Network Group-1 | bx |
| PLMN B | Non-Terrestrial Network Group-2 | by |

Table 8 shows an example scenario of a data store 412 of the PLMNs discovered by the UE 202. For example, PLMN A supports the terrestrial network with b3, b41 and b66 bands and the non-terrestrial network with bx band. Similarly, PLMN B supports the terrestrial network supports with b3, b5 and b66 bands and the non-terrestrial network with by band. The UE 202 may select PLMN A and bands b3, b41 and b66 as terrestrial network group-1; PLMN A and bands bx as non-terrestrial network group-1; PLMN B and bands b3, b5, b66 as the terrestrial network group-2; and PLMN B and bands by as the non-terrestrial network group-2. After grouping the PLMNs and the frequency bands in groups, the UE 202 may assign priority in the following order:

terrestrial network group-1;
  terrestrial network group-2, (considering PLMN A having higher priority than PLMN B as per the PLMN configuration);
  non-terrestrial network group-1; and
  non-terrestrial network group-2.

The PLMN A may have a higher number of services and multiple supported RAT(s) than PLMN B. The UE 202 may utilise the PLMN information of the datastore in Table 8 during higher priority PLMN search or during cell selection/re-selection to select the higher priority group or select a cell that belongs to the same group.

Figure 10:
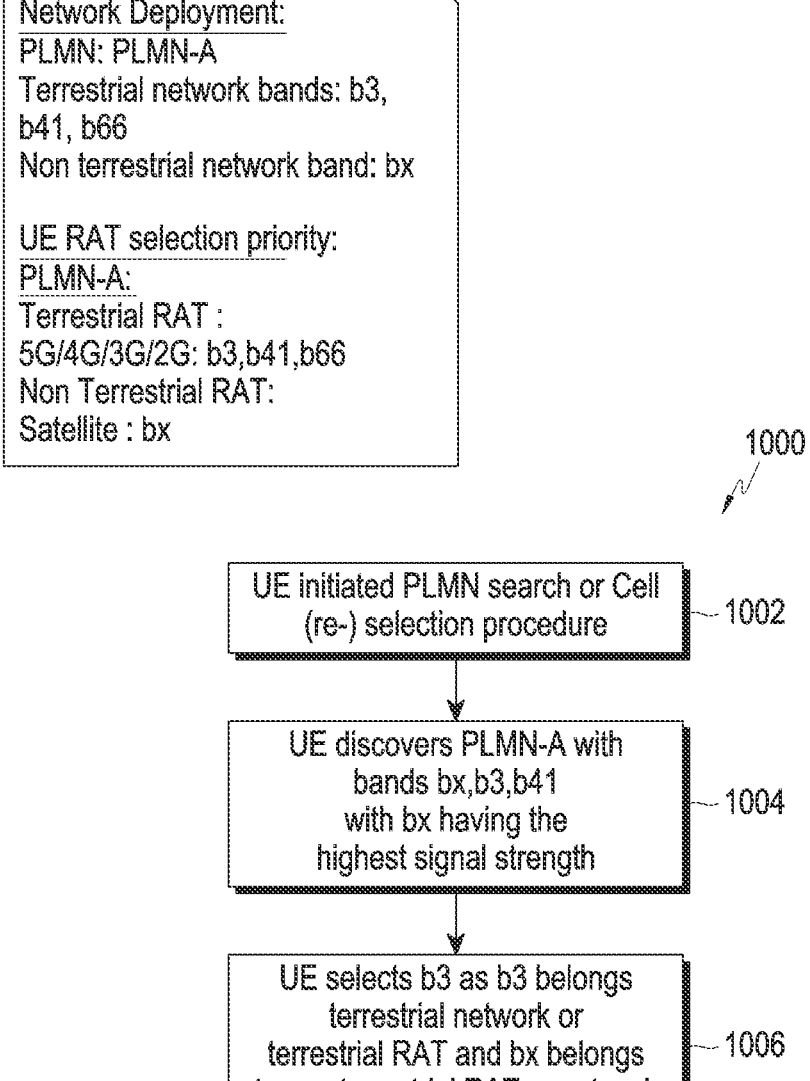
FIG. 10 is a flowchart depicting an example process for considering non-terrestrial network as a different radio access technology (RAT), according to an embodiment of the disclosure.

FIG. 10 is a flowchart showing a method for an example process for considering a non-terrestrial network as a different RAT, according to an embodiment of the disclosure.

Referring to FIG. 10, in a method 1000, the UE 202 identifies the one or more PLMNs available in the network coverage area of the UE 202. The UE 202 assigns a higher priority to the PLMNs with a higher signal strength. The UE 202 performs the selection of the one or more PLMNs based on the priority determined of the group.

For an example, consider the network has deployed non-terrestrial network on band bx and terrestrial network over band say b3, b41 and b66. The UE 202 segregates the RAT based on RAT type (e.g., terrestrial RAT and non-terrestrial RAT). The UE 202 may consider b3, b41, b66 bands as terrestrial network RATs (e.g., 5G RAT, 4G RAT, 3G RAT, $2^{nd}$ generation (2G) RAT, wideband code division multiple access (WCDMA) RAT, and the like) and bx as a non-terrestrial network RAT (e.g., satellite network).

At operation 1002, the UE 202 performs a PLMN search or a cell selection/re-selection in the network coverage area. At operation 1004, during the PLMN search or the cell selection/re-selection, the UE 202 may find the frequency bands bx, b3 and b41 bands having the highest signal strength. At operation 1006, the UE 202 may latch on to any of the terrestrial bands based on the priority list; for example, the UE camps on b3 as b3 is having highest signal strength and b3 is a terrestrial network RAT, whereas bx belongs to a non-terrestrial network RAT.

The various actions in the method 1000 may be performed in the order presented, in a different order or simultaneously. Further, in some embodiments, some actions listed in FIG. 10 may be omitted.

Figure 11A:
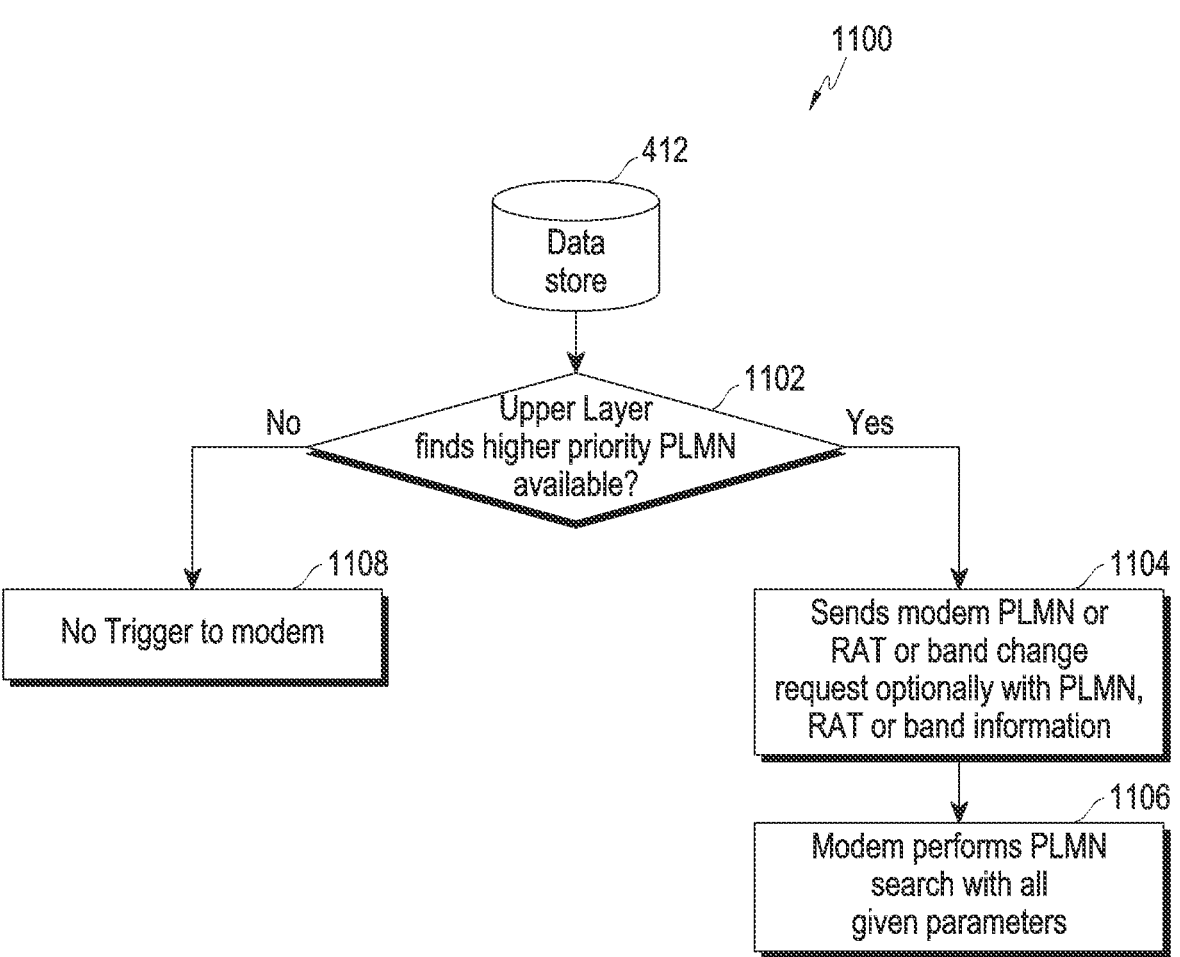
FIG. 11A is a flowchart depicting a method for an application processor (AP) performing a PLMN search, according to an embodiment of the disclosure.

FIG. 11A is a flowchart for a method for an application processor (AP) performing a PLMN search, according to an embodiment of the disclosure.

Referring to FIG. 11A, the UE 202 receives a request for the PLMN selection from a higher layer of the UE 202. An example of the higher layer of UE 202 includes, but is not limited to, an application processor. At operation 1102, the UE 202 determines, if a higher priority PLMN has been found. At operation 1104, the UE 202 sends the request to change at least one of the PLMN, RAT and a frequency band to a modem upon determining availability of the higher priority PLMN. At operation 1106, the application processor or the higher layer of the UE 202 may trigger a modem to perform PLMN selection command with the PLMN information, with band or list of bands information, RAT (e.g., 4G/5G, and the like), and the frequency to be camped on. The various actions in method 1100 may be performed in the order presented, in a different order or simultaneously. Further, in some embodiments, some actions listed in FIG. 11A may be omitted.

In an embodiment, the higher layer of the UE 202 may trigger the PLMN selection command when it discovers the available bands, the frequencies and the PLMNs in a particular location at a particular time. The UE 202 may discover the available bands, the frequencies and the PLMNs in a particular location at a particular time using, but not limited to geo fencing. The modem may trigger the PLMN search taking all parameters that the application processor sends to perform PLMN search or at least one of the PLMN, the frequency band and the RAT selection. At operation 1108, if it is determined that the higher priority PLMN is not available, then the modem does not perform any PLMN search.

Figure 11B:
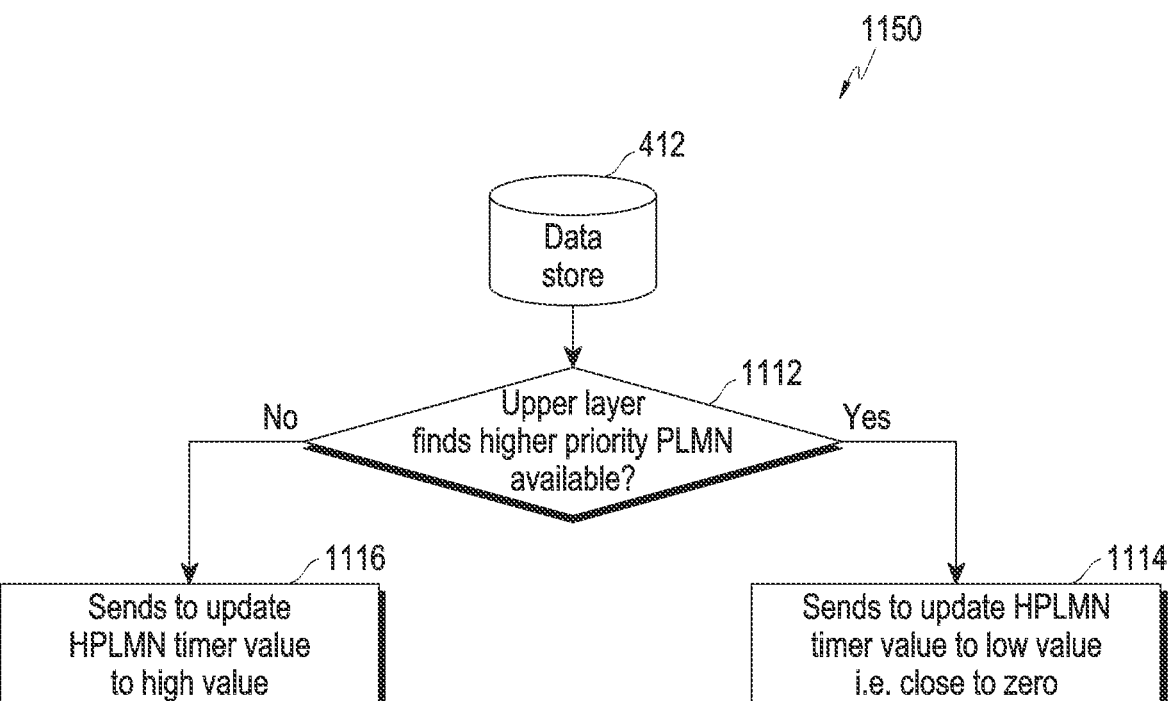
FIG. 11B is a flowchart depicting a method for performing a PLMN search and updating an HPLMN timer by an application processor (AP), according to an embodiment of the disclosure.

FIG. 11B is a flowchart depicting a method for performing a PLMN search and updating the HPLMN timer by an application processor (AP), according to an embodiment of the disclosure.

Referring to FIG. 11B, in a method 1150, the higher layer of the UE 202 may also configure and update a higher priority PLMN search (HPLMN) timer based on the available PLMN. At operation 1112, the UE 202 determines, if a higher priority PLMN is found. At operation 1114, the UE 202 sends a command to update the HPLMN timer value to a low value upon determining availability of the higher priority PLMN. At operation 1116, the UE 202 sends a command to update the HPLMN timer value to a higher value, upon determining an unavailability of the higher priority PLMN. In an embodiment, the modem may wait till a predefined HPLMN timer value ends or until the current ongoing service is ended. In an embodiment, the modem may apply a new HPLMN timer value that is being sent by the higher layer of the UE 202. The various actions in method 1150 may be performed in the order presented, in a different order or simultaneously. In yet another embodiment, as per the methods disclosed in this embodiment, the UE 202 may search or select or even consider any allowable PLMN(s), which are not a part of preferred PLMN List (e.g. —PLMN(s) which are not a part of HPLMN, EHPLMN, OPLMN, UPLMN) (e.g. —random PLMNs which are allowable for the UE and not a part of HPLMN, EHPLMN, OPLMN, UPLMN) as a part of PLMN selection candidate during Higher Priority PLMN Search. The UE may select random PLMN(s) to get better services (i.e., better NTN services or better terrestrial services). Optionally, the UE may select random PLMN(s), optionally if the random PLMN(s) is able to provide better services to the UE (for ex-terrestrial service) when the UE is camped or registered to/for a comparatively inferior service (for ex-non-terrestrial service or poor non-terrestrial service) Further, in some embodiments, some actions listed in FIG. 11B may be omitted.

TABLE 9

| Priority | PLMN | RAT | Band/Frequency |
|---|---|---|---|
| 1 | PLMN-A | 5G | n28, n78 |
| 2 | PLMN-A | 4G | b1, b3, b41, b66 |
| 3 | PLMN-B | 5G | n66, n71 |
| 4 | PLMN-B | 4G | b3, b41 |
| 5 | PLMN-C | 5G | n78 |
| 6 | PLMN-A | Satellite | b14 |
| 7 | PLMN-B | Satellite | b5 |

Table 9 shows an example of pre-configuring the priority for PLMN, Band, RAT combination. The priority of the PLMN is set according to the type of network, that is terrestrial networks are given a higher priority, then the type of RAT is considered, e.g., 5G RAT is given higher priority than 4G and then 3G. The number of frequency bands available for each PLMN is also considered while pre-configuring the priority of the PLMN. UE may be pre-configured with PLMN, RAT, band or frequency priority for each PLMN.

In an embodiment, the UE 202 may set the priority of a PLMN by grouping a particular RAT, and frequency band for a particular PLMN and having a different priority level for the same PLMN with a different RAT, and band frequency combination. For example, in Table 9, PLMN B with frequency band n66 and n71 is given a higher priority than PLMN B with frequency band b3 and b41, as the frequency bands n66 and n71 supports 5G RAT whereas frequency bands b3 and b41 support 4G RAT. Non terrestrial networks are always pre-configured as the last priority.

Figure 12:
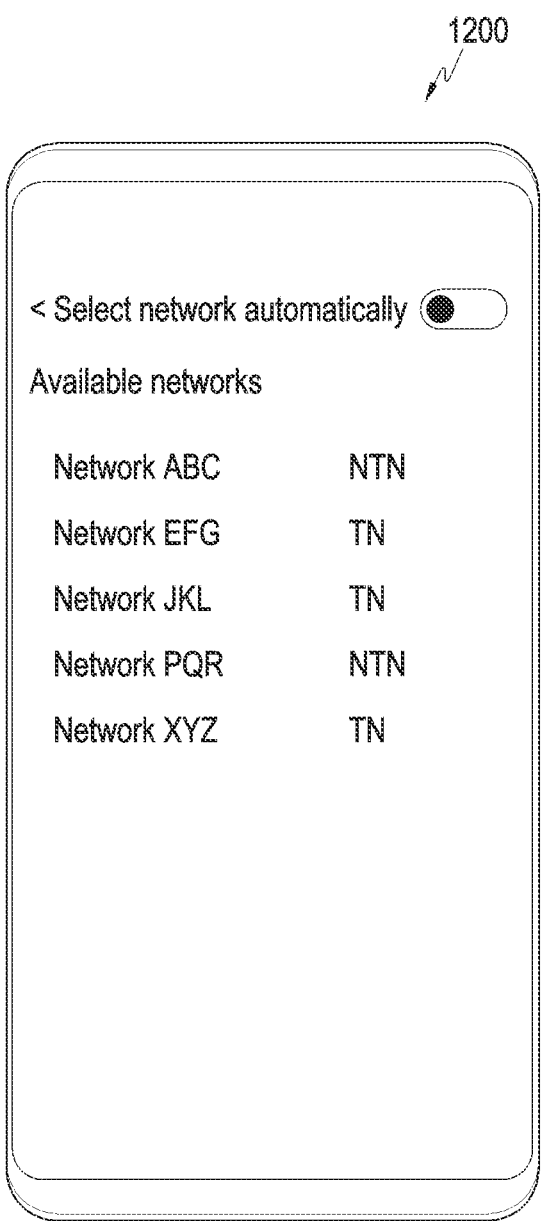
FIG. 12 shows a schematic view of an example of showing terrestrial and non-terrestrial network differently on a UE, according to an embodiment of the disclosure.

FIG. 12 shows a schematic view of an example of showing terrestrial and non-terrestrial network differently on a UE, according to an embodiment of the disclosure.

Referring to FIG. 12, in a schematic view 1200, if a PLMN belongs to the non-terrestrial network, a user may not be aware of the availability of the non-terrestrial network during manual PLMN selection mode. This is because in manual selection mode, it is not shown whether the PLMN belongs to satellite mode or terrestrial mode. So, the user may unknowingly choose the non-terrestrial network over the terrestrial network in manual selection mode, if both the terrestrial network and non-terrestrial networks are available. As shown in FIG. 12, the user may be shown the PLMN with an indication (e.g., text or special icons) that the particular PLMN belongs to the non-terrestrial network or the terrestrial network while showing the list of PLMNs in manual network selection mode.

In an embodiment, the user may not see the PLMNs which belong to the non-terrestrial network. Alternatively, the non-terrestrial networks may only be shown if the UE 202 does not find any PLMN belonging to the terrestrial network. This prevents the UE 202 from falling back to the non-terrestrial PLMN until the terrestrial PLMNs are available and only show non-terrestrial PLMN, if no terrestrial PLMN is available as per manual search results.

In an embodiment, once the PLMN list of all available PLMNs are displayed, and if the user selects the PLMN belonging to the non-terrestrial network, the UE 202 may prompt the user to change the selection to terrestrial network, if a terrestrial network is available. Therefore, the user consent is taken before doing an actual selection of the no-terrestrial network.

Figure 13A:
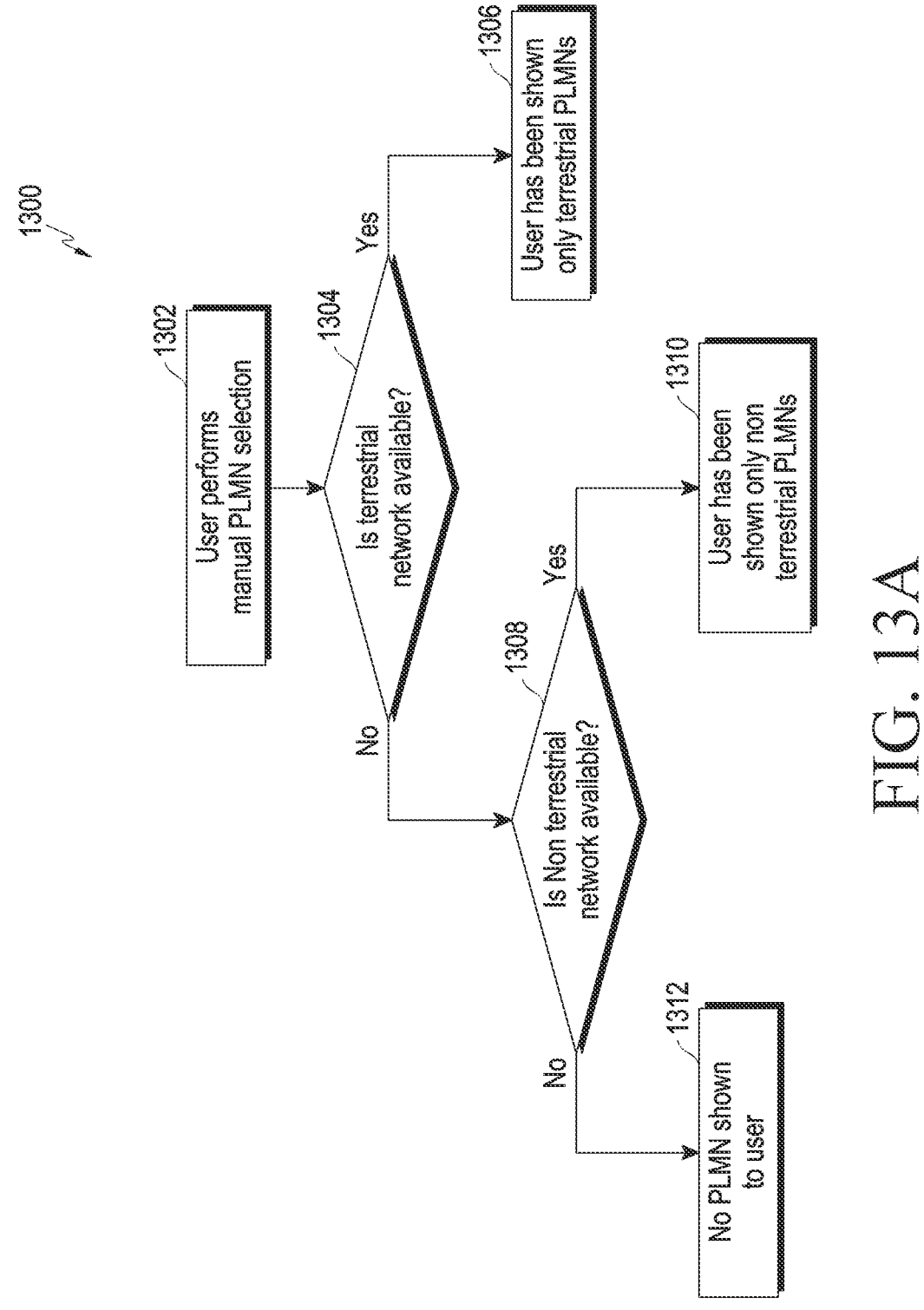
FIG. 13A is a flowchart depicting a method for displaying only non-terrestrial network(s) when a terrestrial network is not available, according to an embodiment of the disclosure.

FIG. 13A is a flowchart depicting a method for displaying only non-terrestrial network(s) when a terrestrial network is not available, according to an embodiment of the disclosure.

Referring to FIG. 13A, in a method 1300, at operation 1302, the user may be prompted to do a manual selection of the network. At operation 1304, the UE 202 performs a check whether the terrestrial network is available in the network coverage area of the UE 202. At operation 1306, the UE 202 determines the availability of the terrestrial network and the UE 202 only displays the terrestrial networks discovered in the network coverage area. At operation 1308, the UE 202 determines the unavailability of the terrestrial network and performs a check for the availability of the non-terrestrial network. At operation 1310, the UE 202 displays the list of the non-terrestrial PLMNs discovered in the network coverage area as there are no terrestrial networks available at the point of time. At operation 1312, the UE 202 does not display any available network as none of the terrestrial networks and the non-terrestrial networks are available at the point of time. The various actions in method 1300 may be performed in the order presented, in a different order or simultaneously. Further, in some embodiments, some actions listed in FIG. 13A may be omitted.

Figure 13B:
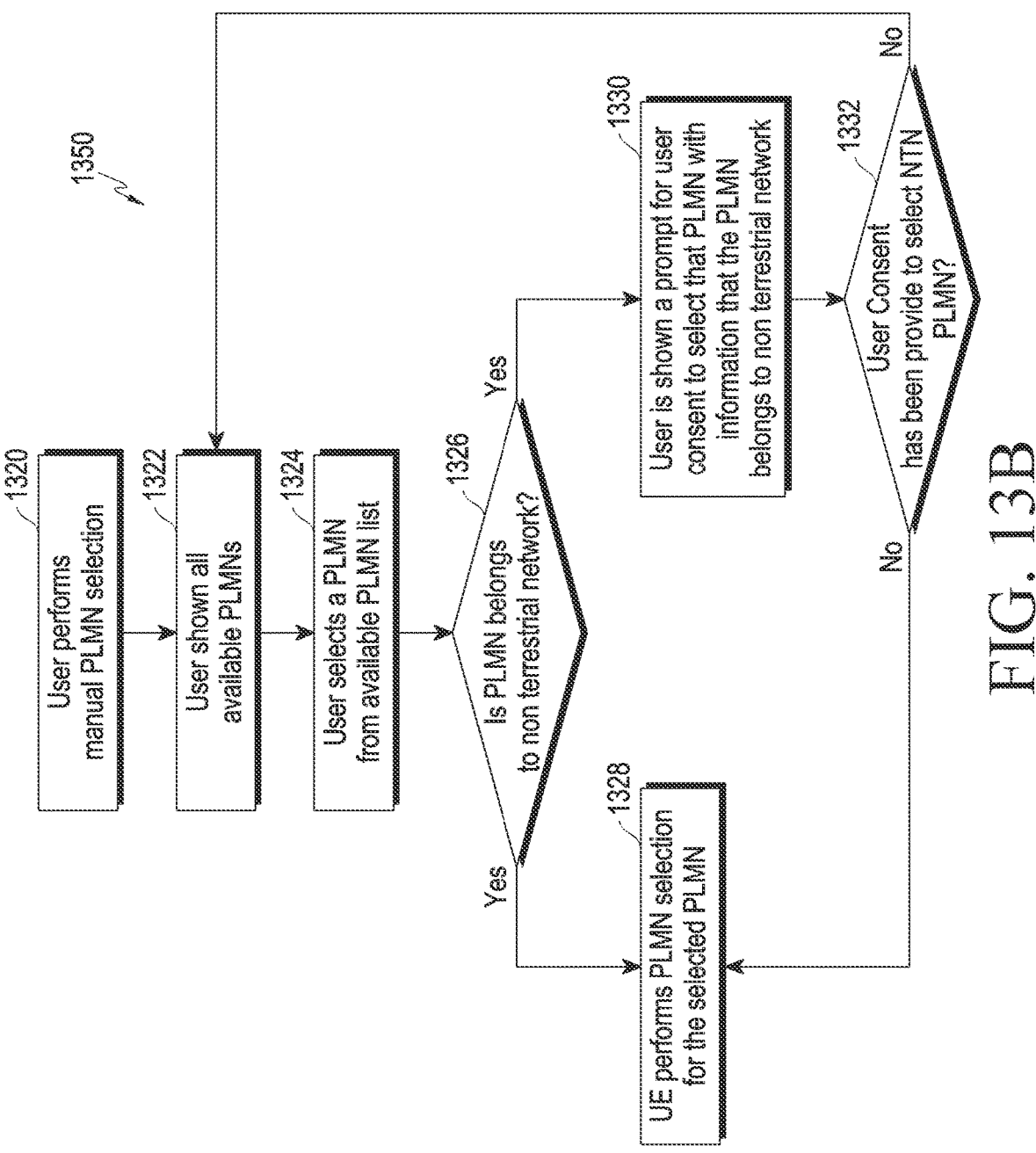
FIG. 13B is a flowchart depicting a method for prompting a user before a selection of a non-terrestrial network manually, according to an embodiment of the disclosure.

FIG. 13B is a flowchart depicting a method for prompting the user before the selection of the non-terrestrial network manually, according to an embodiment of the disclosure.

Referring to FIG. 13B, in a method 1350, at operation 1320, the user may be prompted to do a manual selection of the network. At operation 1322, the UE 202 displays all the available networks (the terrestrial networks as well as the non-terrestrial networks) in the network coverage area. At operation 1324, the UE 202 prompts the user to make a selection from the displayed available networks and the user performs a manual selection of the network. At operation 1326, the UE 202 performs a check whether the user selected network PLMN is the terrestrial network or the non-terrestrial network. At operation 1328, the UE 202 determines the manually selected PLMN is the terrestrial network and confirms the selection automatically. At operation 1330, the UE 202 determines the manually selected PLMN is the non-terrestrial network and displays a prompt on the UE 202 for the user consent to select that PLMN with information that the PLMN belongs to the non-terrestrial network. At operation 1332, the UE 202 receives a consent for the selection of the PLMN belonging to the non-terrestrial network. Again, the UE loops back to operation 1328 where the selection of the PLMN gets confirmed by the UE 202. If the UE 202 does not receive a consent for the selection of the PLMN belonging to the non-terrestrial network, then the UE 202 may again display the list of available PLMNs in the network coverage area. The various actions in the method 1350 may be performed in the order presented, in a different order or simultaneously. Further, in some embodiments, some actions listed in FIG. 13B may be omitted.

Figure 14A:
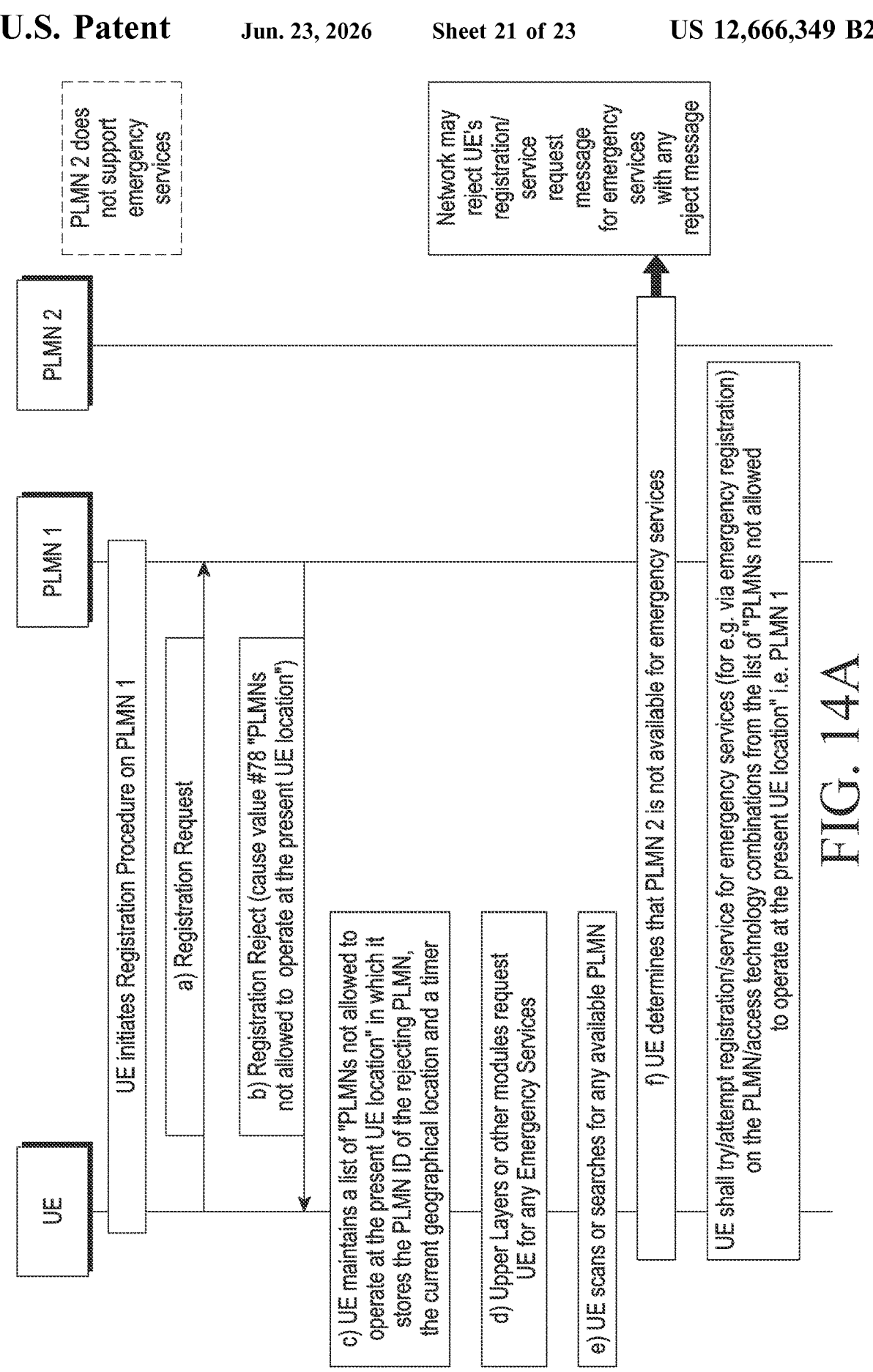
FIG. 14A illustrates a registration/service for emergency services on the PLMN/access technology combinations, according to an embodiment of the disclosure.

FIG. 14A illustrates a registration/service for emergency services on the PLMN/access technology combinations, according to an embodiment of the disclosure.

Referring to FIG. 14A, a method and a system for handling emergency services in wireless communication is illustrated. The proposed method handles emergency services in wireless communication, when PLMN is not allowed to operate at the present UE 202 Location.

Another embodiment as disclosed herein relates to a method for selecting a PLMN, wherein the method comprising attempting by the UE 202 to obtain a service on a PLMN through a non-terrestrial network. The method further comprises receiving by the UE 202 a rejection message from the network for the UE 202's registration request. The method further comprises maintaining a list, by the UE, of "PLMNs not allowed to operate at the present UE location" in which the UE 202 stores the PLMN ID of the rejecting PLMN, the current geographical location, and a timer. The method further comprises receiving a request by the UE 202 from the upper layer of the UE 202 for an emergency service(s). The method furthers comprises scanning by the UE 202 for any available PLMN that provide emergency service(s). In an embodiment, the UE 202 scans for emergency services if the UE 202 determines that there exists an entry for the PLMN in the list of "PLMNs not allowed to operate at the present UE location". the UE 202 scans for emergency services if the UE 202 determines that the entry for the PLMN includes a geographical location, and the UE 202 determines that the distance to the current UE location is smaller than a UE implementation specific value; or UE 202 determines that the entry for the PLMN does not include a geographical location or the UE 202 cannot determine whether the distance to the current UE location is smaller than a UE implementation specific value. the UE 202 also scans for emergency services if the UE 202 determines that there is only one available PLMN or network combination not supporting emergency services. In an embodiment the UE 202 may determine that none of the PLMN supports emergency services that are different from PLMN combinations where the PLMN meets the conditions meet the conditions to establish an emergency service session and the access technology is one of the non-terrestrial networks for example, satellite NG-RAN or satellite E-UTRAN.

In an embodiment, when the MS or the UE 202 attempts for emergency services on the available PLMN/access technology combination that does not support emergency services, then the MS or the UE 202 may attempt registering for emergency services (e.g., through emergency registration) on the PLMN/access technology combinations where the PLMN is a PLMN meeting the conditions to establish an emergency service session and the network access technology is the non-terrestrial network which may include but is not limited to a satellite NG-RAN or the satellite E-UTRAN network.

In an embodiment, if there is at-least one available PLMN or the network combination, which does support emergency services, that is different from PLMN or the access technology combinations where the PLMN meets the conditions meet the conditions to establish an emergency service session and the access technology is one of the non-terrestrial networks for example, satellite NG-RAN or satellite E-UTRAN, then the MS or the UE 202 attempts registering for the emergency services (e.g., via emergency registration) on that PLMN or the network access technology combinations.

in an embodiment, when MS or the UE 202 attempts for the emergency services on the available PLMN, which does not support emergency services, then the MS or the UE 202 attempts registering for emergency services (e.g., via emergency registration) on the PLMN which is part of "PLMNs not allowed to operate at the present UE location".

In an embodiment, if there is at-least one available PLMN, which does support emergency services, that is different from PLMN or the network combinations in the list of "PLMNs not allowed to operate at the present UE location", then the MS or the UE 202 may attempt registering for emergency services (e.g., through emergency registration) on that PLMN or the network combinations.

For example, a first PLMN (PLMN-1) is part of "PLMNs not allowed to operate at the present UE location". Optionally, UE 202 is aware that PLMN-1 supports emergency services. And, a second PLMN (PLMN-2) does not support emergency service, then the MS or the UE 202 may attempt registering for emergency services (e.g., via emergency registration) on the first PLMN (PLMN-1).

In an embodiment, the UE 202 determines whether a given PLMN or the network combination supports emergency services by enabling one of the following methods: the UE 202 determines an NG-RAN broadcast information indicating whether emergency services is supported or not supported. The UE 202 may receive a rejection message from the network for the UE's registration/service request message for emergency services with cause "Emergency services not supported". The rejection message indicates the rejection is for emergency services. In an embodiment, the network may provide any other type of indication message to inform the UE 202 that the rejection is for emergency services only. In an embodiment, the network (any 5G core network function, e.g., AMF) may indicate to the UE 202 whether emergency services are allowed or not allowed on the broadcasted PLMN Identity (PLMN-ID). The network may also indicate to the UE 202 whether emergency services are allowed or not allowed on the at least one of a group of PLMN Identities (PLMN-ID(s)) or on the area/country/(one or more) country/countries from the group of countries derived from the broadcasted PLMN-ID(s). The PLMN IDs may be derived through at least one of the AS or the NAS signalling message like registration accept/reject message, DL NAS TRANSPORT, service accept/reject message, Deregistration Accept/Reject message or through network triggered deregistration procedure. The PLMN IDs may be derived through network triggered procedures like UE 202 configuration update (UCU) command, UE 202 parameters update (UPU) Command, and the like. The UE 202 shall use this information and determine whether the UE 202 may scan and/attempt registering on the PLMN-ID or at least one of group of PLMN Identities (PLMN-ID(s)) for emergency services or emergency registration. The UE 202 may search based on whether emergency services are allowed or not allowed on the selected PLMN-ID or at least one of group of PLMN Identities (PLMN-ID(s)).

FIG. 14B illustrates a scenario where a PLMN supports emergency services, according to an embodiment of the disclosure.

Referring to FIG. 14B, for registering for emergency service sessions, the following conditions may be taken into consideration If there exists an entry for a PLMN in the list of "PLMNs not allowed to operate at the present UE location" and the entry for the PLMN includes a geographical location, and the UE 202 determines that the distance to the current UE location is smaller than a UE implementation specific value. The PLMN may allow for registering for the emergency service session when the entry for the PLMN does not include a geographical location or the UE 202 cannot determine whether the distance to the current UE location is smaller than a UE implementation specific value. In the case, where there are more than one available PLMN/ access technology combination, which may or may not support emergency services that are different from PLMN where the PLMN meets the above conditions for establishing the emergency service sessions and the access technology is the non-terrestrial network such as the satellite NG-RAN or the satellite E-UTRAN.

In this case, when there are more than one available PLMN/access, other than the PLMN where the PLMN meets the above conditions for establishing the emergency service sessions and the access technology is the non-terrestrial network such as the satellite NG-RAN or the satellite E-UTRAN, then the UE 202 shall perform at least one of the below actions in any combination in the case if the available PLMN scanned by the UE 202 supports emergency services, the UE 202 shall select the available PLMN for the emergency services. The UE 202 may not any further re-attempt for registering for emergency services on PLMN which does not support emergency services or the PLMN— which is part of "PLMNs not allowed to operate at the present UE location".

In an embodiment, The UE 202 performs the PLMN Selection as per "PLMN selection as per 23.122 without RPLMN" or "PLMN selection as per 23.122 with RPLMN" and attempt registering for the emergency services.

In an embodiment, the UE 202 may enter one of a 5GMM sublayer states, e.g., 5GMM-REGISTERED.PLMN-SEARCH state, a 5GMM-REGISTERED.NO-CELL-AVAILABLE, a 5GMM-REGISTERED.UPDATE-NEEDED, a 5GMM-REGISTERED, and an ATTEMPTING-REGISTRATION-UPDATE state. The UE 202 may enter at least one of the EMM sublayer states if UE 202 is on E-UTRA cell (i.e., LTE network) to perform PLMN selection as per TS 23.122 and attempt registering for the emergency services (e.g., via emergency registration).

In an embodiment, the UE 202 may select and camp on any non-3GPP access if available in the same area. Alternatively, UE 202 may not select and camp on any non-3GPP access if available in the same area.

In an embodiment, the UE 202 may perform emergency registration for emergency services on any 3GPP access or any RAT(s) or PLMN(s). In another embodiment, the UE 202 may not perform emergency registration for emergency services on any 3GPP access or any RAT(s) or PLMN(s).

In an embodiment, the UE 202 may select and camp on other RAT (e.g., terrestrial network) other than the non-terrestrial and attempt registering for emergency services (e.g., via emergency registration).

In an embodiment, once the UE 202 determines the PLMNs which are not allowed for emergency services, UE

202 will de-prioritize them during PLMN selection procedure for the emergency services.

In yet another embodiment, for registering for emergency service sessions, the UE 202 may check for if there exists the entry for the PLMN in the list of "PLMNs not allowed to operate at the present UE location" and the entry for the PLMN includes a geographical location, and the UE 202 determines that the distance to the current UE location is smaller than a UE implementation specific value. The UE 202 may check if there exists the PLMN in the PLMN list not allowed to operate at the present UE location and the entry for the PLMN does not include a geographical location or the UE 202 cannot determine whether the distance to the current UE location is smaller than a UE implementation specific value.

There is at least one available PLMN and network combination which supports emergency services and is different from PLMN/access technology combinations where the PLMN is a PLMN meeting conditions in 1) a) or 1) b) and the access technology is satellite NG-RAN or satellite E-UTRAN; then MS should not (re-)attempt to make emergency calls via satellite NG-RAN or satellite E-UTRAN in the PLMN meeting conditions for searching for an available PLMN.

For example, PLMN-1 is part of "PLMNs not allowed to operate at the present UE location". Optionally, the UE 202 is aware that PLMN-1 supports emergency services. PLMN-2 does not support emergency service (e.g., There can be one or more PLMNs which does not support emergency services). PLMN-3 support emergency service. (e.g., There can be one or more PLMNs which support emergency services), then MS shall attempt registering for emergency services (e.g., via emergency registration) on PLMN-3 (i.e., select at least one of the PLMNs which support emergency services and optionally not part of "PLMNs not allowed to operate at the present UE location)".

Figure 15:
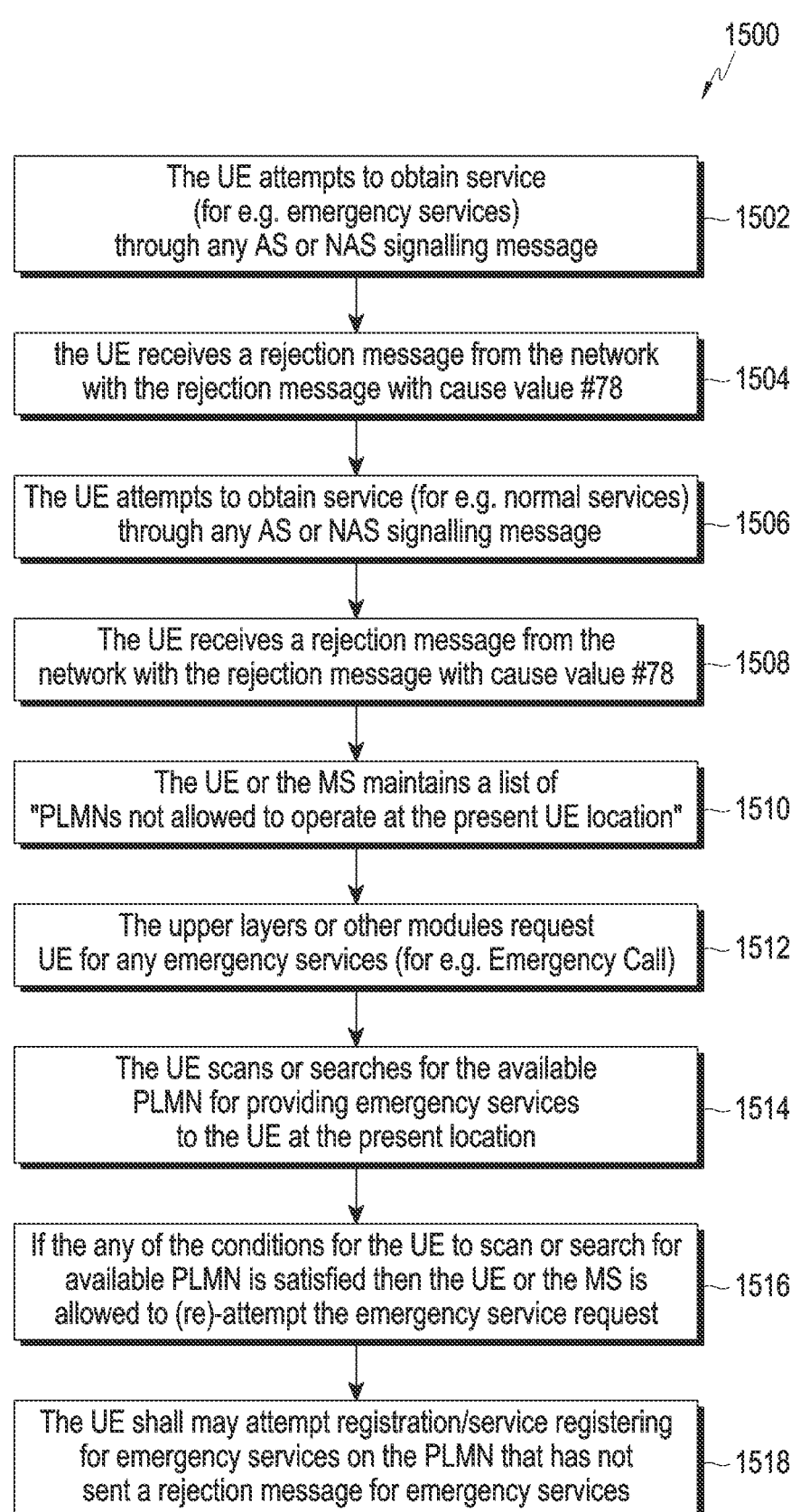
FIG. 15 is a sequential diagram illustrating signaling between the UE, the PLMNs, according to an embodiment of the disclosure.

FIG. 15 is a sequential diagram illustrating signalling between a UE, and PLMNs, according to an embodiment of the disclosure. The proposed solution can be described in the following operations:

Referring to FIG. 15, in a method 1500, at operation 1502, the UE 202 attempts to obtain the service (e.g., emergency services) (through any AS or NAS Signalling message, e.g., Registration Request or Service Request, and the like) on the PLMN (e.g., PLMN-1) through satellite NG-RAN access technology or satellite E-UTRAN access technology. At operation 1504, the network (e.g., first PLMN (PLMN-1)) rejects UE's registration/service request message with a rejection message (e.g., Registration Reject message or Service Reject message, and the like) with cause value #78 "PLMNs not allowed to operate at the present UE location". For example—Network (e.g., PLMN-1) rejects UE's registration/service request message for emergency services with any reject/accept message (e.g., Registration Reject message or Service Reject message, and the like) with cause value #78. At operation 1506, the UE 202 attempts to obtain service (e.g., normal services) (through any AS or NAS Signalling message, e.g., Registration Request or Service Request, and the like) on another PLMN (e.g., PLMN-2) through satellite NG-RAN access technology or satellite E-UTRAN access technology. At operation 1508, the UE 202 receives a rejection message from the network. The networks (e.g., PLMN-2) rejects UE's registration/service request message with any reject/accept message (e.g., Registration Reject message or Service Reject message, and the like) with cause value #78 "PLMNs not allowed to operate at the present UE location". For example, network (e.g., PLMN-2) rejects UE's registration/service request message for normal services with any reject/accept message (e.g., Registration Reject message or Service Reject message, and the like) with cause value #78. At operation 1510, the UE 202 or the MS maintains a list of "PLMNs not allowed to operate at the present UE location" in which it stores the PLMN ID of the rejecting PLMN(s) (e.g., PLMN-1, PLMN-2), the current geographical location and a timer.

In an embodiment, the UE 202 shall maintain separate list(s) or two different list(s) of "PLMNs not allowed to operate at the present UE location" and optionally the current geographical location and a timer associated with the rejecting PLMN ID for normal services and one separate list for the emergency services respectively.

For example, If the UE 202 attempts to obtain emergency services on a first PLMN (PLMN-1) through satellite NG-RAN access technology or satellite E-UTRAN access technology and gets a rejection message from the network with cause value #78 "PLMNs not allowed to operate at the present UE location", UE 202 stores the selected first PLMN (PLMN-1) in the list of "PLMNs not allowed to operate at the present UE location for emergency services".

If the UE 202 attempts to obtain normal services on a second PLMN (PLMN-2) through satellite NG-RAN access technology or satellite E-UTRAN access technology and gets a rejection message from the network with cause value #78 "PLMNs not allowed to operate at the present UE location", UE 202 stores the selected second PLMN (PLMN-2) in the list of "PLMNs not allowed to operate at the present UE location".

In an embodiment, when the UE 202 gets a rejection message from the network with cause value #78 while registering for emergency services, the UE 202 may perform any of the below operations in any order or combinations: UE 202 may maintain a separate list of "PLMNs not allowed to operate at the present UE location for emergency services". The list for not allowing emergency services is different and maintained separately from the list of "PLMNs not allowed to operate at the present UE location". In an embodiment, the UE 202 may delete any existing entry for the rejecting PLMN (e.g., PLMN-1) and store a new entry of the PLMN identity (PLMN ID) of the rejecting PLMN in the list of "PLMNs not allowed to operate at the present UE location for emergency services", the current geographical location and a timer.

Upon storing a new entry, the UE 202 shall reset, delete, or stop any existing timer for the PLMN ID in the new entry based on the for PLMNs not allowed for emergency services list and starts a timer instance associated with the entry with an implementation specific value that shall not be set to a value smaller than the timer value indicated by the network, if any. In an embodiment, the in an embodiment, the UE 202 shall reset or delete any existing geographical location stored for the PLMN ID in the new entry based on the list and store the current geographical location for the PLMN ID in the new entry where the reject cause is received by the UE.

In an embodiment, the UE 202 shall not attempt to access the PLMN for emergency services via satellite NG-RAN access technology or satellite E-UTRAN access technology which is part of the list of "PLMNs not allowed to operate at the present UE location for emergency services" if the current UE location is known, a geographical location is stored for the entry of this PLMN, and the distance to the current UE location is smaller than a UE implementation specific value, and the timer associated with the entry of this PLMN is still running and not expired.

In an embodiment, the UE 202 shall not attempt to access the PLMN (e.g., first PLMN) for emergency services through the satellite NG-RAN access technology or the satellite E-UTRAN access technology which is part of the list of "PLMNs not allowed to operate at the present UE location for emergency services". The UE 202 may not attempt registering on the first if the only the PLMN(s) (e.g., PLMN-1, PLMN-2) available to the UE 202 is that of the non-terrestrial network. For example, satellite NG-RAN or satellite E-UTRAN where the PLMN has rejected the UE 202 registration with "PLMN not allowed to operate in the country of the UE's location" (cause code #78).

In an embodiment, the UE 202 shall attempt to access the PLMN (e.g., first PLMN) for emergency services via satellite NG-RAN access technology or satellite E-UTRAN access technology which is part of the list of "PLMNs not allowed to operate at the present UE location for emergency services" with the lowest priority if the only network/PLMN(s) (e.g., PLMN-1, PLMN-2) available to the UE 202 is the PLMN has rejected the UE 202 registration with "PLMN not allowed to operate in the country of the UE's location" (cause code #78).

In an embodiment, each entry shall be removed if for the entry: the UE 202 successfully registers via satellite NG-RAN access technology or the satellite E-UTRAN access technology to the PLMN stored in the entry; the timer instance associated with the entry expires; or if the current UE location is known, a geographical location is stored for the entry of this PLMN, and the distance to the current UE location is larger than a UE implementation specific value.

In an embodiment, the UE 202 maintains a common list or only one list of "PLMNs not allowed to operate at the present UE location" (i.e., no separate lists for normal and emergency services). The UE 202 remembers and keeps a track that the rejecting PLMN ID (e.g., first PLMN) has received a reject cause (e.g., Reject Cause #78) while registering for emergency services over satellite NG-RAN access technology or the satellite E-UTRAN access technology and optionally, the rejecting PLMN ID (e.g., first PLMN) is not allowed for emergency services over satellite NG-RAN access technology or the satellite E-UTRAN access technology if the reject message (or indication) from the network with cause value #78 is received while UE 202 is registering for emergency services.

In an embodiment, the UE 202 may not attempt to access the PLMN (e.g., first PLMN) for emergency services via satellite NG-RAN access technology or satellite E-UTRAN access technology (which is part of the list of "PLMNs not allowed to operate at the present UE location" and the rejection message from the network with cause value #78 is received while the UE 202 is registering for emergency services) if the only network/PLMN(s) (e.g., PLMN-1, PLMN-2) available to the UE 202 is that of the no-terrestrial network. The non-terrestrial network may be the PLMN that has rejected the UE registration with "PLMN not allowed to operate in the country of the UE's location" (cause code #78).

In an embodiment, the UE 202 shall attempt to access the first PLMN for emergency services via satellite NG-RAN access technology or satellite E-UTRAN access technology with the lowest priority if the only network or the PLMN(s) (e.g., first PLMN and second PLMN) available to the UE 202 is the PLMN that has rejected the UE 202 registration with "PLMN not allowed to operate in the country of the UE's location" (cause code #78).

Optionally, the operations 1502 to 1510 can be in sequence or can be executed in any order.

At operation 1512, the upper layers or other modules request UE 202 for any emergency services (e.g., Emergency Call). At operation 1514, the UE 202 scans or searches for any available PLMN which can provide emergency services. At operation 1516, for emergency service sessions, if the network/PLMN(s) (e.g., PLMN-1, PLMN-2) available to the UE 202 is that of a satellite NG-RAN or satellite E-UTRAN where the PLMN has rejected the UE 202 registration with "PLMN not allowed to operate in the country of the UE's location" (cause code #78), but UE 202 has not received reject for emergency services, then the UE 202 may attempt registering for emergency services (e.g., via emergency registration) on those PLMN(s) (e.g., PLMN-1 or PLMN-2). The UE 202 may select one of the PLMNs from the list of "PLMN not allowed to operate in the country of the UE's location" in random order, depending on UE implementation order, or based on the configured priority order among those PLMNs in the UE 202 by HPLMN, RPLMN or visited PLMN (VPLMN) as described in TS 23.122 or in order as specified in 3GPP TS 23.122.

In an embodiment, the UE 202 may meet the conditions registering on the non-terrestrial networks for emergency services, then, the UE 202 or the MS is allowed to (re)-attempt the emergency service request or select and attempt registration on the PLMN(s) (e.g., PLMN-1, PLMN-2) which are present in the list of "PLMNs not allowed to operate at the present UE location, but UE 202 has not received reject for emergency services.

In operation 1516, if some of the PLMN(s) are included in the list for getting rejection message #78 for "PLMNs not allowed to operate at the present UE location" while registering for emergency services and some of the PLMN(s) are included in the list for getting reject #78 while registering for normal services, the UE 202 may prioritize and select the PLMN(s) in the list of "PLMNs not allowed to operate at the present UE location" to attempt registration for emergency services. The UE 202 may also attempt registering over the PLMN(s) for emergency services for which the UE 202 has received an, optionally integrity protected, reject message with cause value #78 "PLMNs not allowed to operate at the present UE location, when the UE 202 may have attempted registering on the same PLMN for normal services.

The UE 202 may select one of the PLMNs from the list of "PLMN not allowed to operate in the country of the UE's location" which has not got reject for emergency services in random order, depending on UE implementation, or based on the configured priority among those PLMNs in the UE 202 by HPLMN or RPLMN or VPLMN as described in TS 23.122.

In an embodiment, if the non-terrestrial PLMN(s) available to the UE 202 has rejected the UE 202 registration with "PLMN not allowed to operate in the country of the UE's location". if some of the PLMN(s) from the above list are included in this list for getting rejection message for not allowed to operate on emergency services at the UE location while registering for emergency services and some of the PLMN(s) are included in the list for getting rejection message while registering for normal services, then the UE 202 may prioritize and attempt registering on the PLMN which are present in the list of "PLMNs not allowed to operate at the present UE location" and are not present in the list of "PLMNs not allowed to operate at the present UE location for emergency services". In yet another embodiment, the UE 202 may not attempt registering on the PLMN(s) with lowest priority which are present in the list of "PLMNs not allowed to operate at the present UE location for emergency services".

In yet another embodiment, the non-terrestrial PLMN(s) available to the UE 202 has rejected the UE 202 registration with "PLMN not allowed to operate in the country of the UE's location". Now, if some of the PLMN(s) from the above list are included in this list for getting rejection message for not allowed to operate on emergency services at the UE location while registering for emergency services and some of the PLMN(s) are included in the list for getting rejection message while registering for normal services, then the UE 202 may prioritize and attempt registering on the PLMN which are present in the on the PLMN that the UE 202 may have received reject Cause #78 for registering for normal services. In yet another embodiment, the UE 202 shall not select or shall select with lowest priority those PLMN(s) (e.g., PLMN-1) which are present in the list of "PLMNs not allowed to operate at the present UE location" and for which UE 202 tracks or remembers that the reject cause #78 was received from this PLMN when UE 202 is registering for emergency services.

In yet another embodiment, the non-terrestrial PLMN(s) available to the UE 202 has rejected the UE 202 registration with "PLMN not allowed to operate in the country of the UE's location". Now, if some of the PLMN(s) from the above list are included in this list for getting rejection message for not allowed to operate on emergency services at the UE location while registering for emergency services and some of the PLMN(s) are included in the list for getting rejection message while registering for normal services, then the UE 202 may prioritize and attempt registering on the PLMN which are present in the list of "PLMNs not allowed to operate at the present UE location" in below priority order (highest to lowest):

The UE 202 may attempt registering on the PLMN not present in the "PLMNs not allowed to operate at the present UE location for emergency services". In an embodiment, the UE 202 may attempt registering on the PLMN, where the UE 202 may not have received the rejection message for the UE 202 registering for emergency services (when the UE 202 is registering for normal services). The UE 202 may try registering, optionally in random order, depending on UE implementation, or based on the configured priority among those PLMNs in the UE 202 by HPLMN, RPLMN, or VPLMN as described in TS 23.122.

The UE 202 may attempt registering on the PLMN present in the "PLMNs not allowed to operate at the present UE location for emergency services". In an embodiment, the UE 202 may attempt registering on the PLMN, where the UE 202 may have received the rejection message for the UE 202 registering for emergency services. The UE 202 may try registering, optionally in random order, depending on UE implementation, or based on the configured priority among those PLMNs in the UE 202 by HPLMN, RPLMN, or VPLMN as described in TS 23.122.

If there are multiple PLMN(s) satisfying either of the conditions (a) or (b), the UE 202 shall select the PLMN(s) in the priority order as per PLMN selection as per 23.122 without RPLMN, PLMN selection as per 23.122 with RPLMN, or any random order.

Therefore, at operation 1518, if the list of PLMN (s) have more than one entry, then the UE 202 attempts for registering for the emergency services on the PLMN on which rejection message is not received when attempted for emergency services.

For example, the PLMN(s) (e.g., PLMN-1, PLMN-2) might be added to the list of "PLMN not allowed to operate in the country of the UE's location" due to reject cause #78. The UE 202 may or may not attempt for registration for emergency services and get the rejection message If there are no available PLMN(s) in an area apart from the PLMN(s) present in the list of "PLMN not allowed to operate in the country of the UE's location" and UE 202 needs to initiate a request for emergency services, UE 202 may prioritize those PLMN(s) and attempt for registering for emergency services on those PLMN(s) that did not receive the rejection when attempted for emergency services.

The solutions proposed in the embodiments are explained using Satellite NG-RAN Access Technology. However, the solutions proposed in this embodiment are also applicable for satellite E-UTRAN access technology, narrow band (NB)-S1 mode or wide band (WB)-S1 mode via satellite E-UTRAN access and/or narrowband internet of things (NB-IOT) or wideband internet of things (WB-IOT) satellite access/architecture. The solutions proposed in the embodiments are applicable to both 5G system (5GS)/5G core (5GC) and evolved packet core (EPC)/EPS systems.

The Network used in this embodiment is explained using any 5G core network function, e.g., AMF. However, the network could be any of the 5G and EUTRAN core network entities like AMF, session management function (SMF), mobility management entity (MME), and user plane function (UPF) or the network could be any of the 5G, EUTRAN and RAN Entity like eNodeB (eNB), gNodeB (gNB), or NG-RAN, and the like.

The solutions proposed in the embodiment are explained with respect to emergency services as an example. However, the solutions discussed in the embodiments are also applicable for any kind of services such as SNPN, NPN, e-NPN, local area data network (LADN), normal services, drone services, multi-access edge computing (MEC), and the like.

In this embodiment, the NR Satellite Access Network, Satellite Access Network and Satellite NG-RAN access technology are interchangeably used and have the same meaning.

The embodiment disclosed herein describes methods and user equipment for selection of non-terrestrial networks in a wireless communication environment. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., very high-speed integrated circuit hardware description language (VHDL) another programming language, or implemented by one or more VHDL or several software modules being executed on at least one hardware device. The hardware device can be any kind of portable device that may be programmed. The device may also include means which could be e.g., hardware means like, e.g., an application specific integrated circuit (ASIC), or a combination of hardware and software means, e.g., an ASIC and a field programmable gate arrays (FPGA), or at least one microprocessor and at least one memory with software modules located therein. The method embodiments described herein could be implemented partly in hardware and partly in software. Alternatively, the disclosure may be implemented on different hardware devices, e.g., using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method at a user equipment (UE) for selecting a public land mobile network (PLMN), the method comprising:

identifying, by the UE, one or more PLMNs available in a network coverage area of the UE;

identifying, by the UE, a network type of the one or more PLMNs available in the network coverage area of the UE based on a broadcasted and configured timer, the network type comprising at least one of a terrestrial network (TN) and a non-terrestrial network (NTN);

identifying, by the UE, a number of services provided by a respective PLMN from the one or more PLMNs;

prioritizing, by the UE, the one or more PLMNs available in the network coverage area of the UE based on the number of services and the network type; and performing, by the UE, a selection of the one or more PLMNs based on the prioritizing result, wherein the network type is determined to be the NTN, in case that a value determined for the broadcasted and configured timer is greater than a first threshold value, and wherein the network type is determined to be the TN, in case that the value determined for the broadcasted and configured timer is lower than the first threshold value.

2. The method of claim 1, further comprising:

identifying, by the UE, the one or more PLMNs available in the network coverage area of the UE; and storing, by the UE, in a data store, a data related to the one or more PLMNs available in the network coverage area of the UE as a list, wherein the data comprises at least one of a supported radio access technology (RAT), a frequency band, a granularity, the number of services provided by a respective PLMN from the one or more PLMNs, and a network type of the respective PLMN.

3. The method of claim 2, wherein the one or more PLMNs with a higher number of the services is given a higher priority, and stored in the data store higher in the list of the one or more PLMNs available in the network coverage area of the UE.

4. The method of claim 2, wherein the identifying, by the UE, the one or more PLMNs including:

registering a PLMN on the UE;

initiating, by the UE, services provided by the PLMN;

establishing and performing, by the UE, the services over the PLMN;

determining, by the UE, whether the services were established and performed successfully over the PLMN; and updating and storing, by the UE, in the data store, the services established and performed successfully over the PLMN.

5. The method of claim 1, wherein the broadcasted and configured timer comprises a non-access stratum timer (NAS) and an access stratum timer (AS).

6. The method of claim 1, wherein a network type of the respective PLMN is identified based on at least one of:

a timing advance value configured as part of a media access control (MAC) control elements (CE), the timing advance value being a MAC CE to control uplink signal transmission timing, and the UE receiving a higher value of timing advance configured in the NTN compared to the TN;

a round trip time (RTT);

a broadcast message comprising a network type broadcasted by the network in one or more information elements (IE), the broadcast message comprises at least one of a master information block (MIB) and a system information block (SIB); or a non-access stratum (NAS) signaling and an access stratum (AS) signaling comprising the network type broadcasted by the network in one or more information elements (IEs).

7. The method of claim 6, wherein the network type is identified further based on the RTT including:

registering, by the UE, over a PLMN available in the network coverage area;

measuring, by the UE, the RTT of the PLMN;

storing, by the UE, the RTT in a data store; and comparing, by the UE, the RTT to an RTT threshold value to determine the network type, wherein the PLMN having RTT greater than the RTT threshold value is the NTN, else the RTT is lower than the RTT threshold value, the PLMN is the TN.

8. The method of claim 1, further comprising:

maintaining, by the UE, a second list of the one or more PLMNs that belong to the NTN;

setting, by the UE, the second list as a last priority for the selection of the one or more PLMNs; and updating, by the UE, the second list of the one or more PLMNs whenever a new NTN is identified in the network coverage area.

9. The method of claim 2, wherein the one or more PLMNs with a signal strength that is higher is given a higher priority, and stored in the data store higher in the list of the one or more PLMNs.

10. A user equipment (UE) in a wireless communication system, the UE comprising:

a transceiver;

one or more processors; and memory storing one or more computer programs including computer-executable instructions, wherein the instructions, when executed by the one or more processors individually or collectively, cause the UE to:

identify one or more PLMNs available in a network coverage area of the UE, identify a network type of the one or more PLMNs available in the network coverage area of the UE based on a broadcasted and configured timer, the network type comprising at least one of a terrestrial network (TN) and a non-terrestrial network (NTN), identify a number of services provided by a respective PLMN from the one or more PLMNs, prioritize the one or more PLMNs available in the network coverage area of the UE based on the number of services and the network type, and perform, a selection of the one or more PLMN based on the prioritizing result, wherein the network type is determined to be the NTN, in case that a value determined for the broadcasted and configured timer is greater than a first threshold value, and wherein the network type is determined to be the TN, in case that the value determined for the broadcasted and configured timer is lower than the first threshold value.

11. The UE of claim 10, wherein the instructions, when executed by the one or more processors individually or collectively, further cause the UE to:

store, in a data store, a data related to the one or more PLMNs available in the network coverage area of the UE as a list, wherein the data comprises at least one of a supported radio access technology (RAT), a frequency band, a granularity, the number of services provided by a respective PLMN from the one or more PLMNs, and a network type of the respective PLMN.

12. The UE of claim 11, wherein the one or more PLMNs with a higher number of services is given a higher priority, and stored in the data store higher in the list of the one or more PLMNs available in the network coverage area.

13. The UE of claim 11, wherein, for identifying the one or more PLMN, the instructions, when executed by the one or more processors individually or collectively, further cause the UE to:

register, a PLMN on the UE, initiate, services provided by the PLMN, establish and perform, the services over the PLMN, determine, whether the services were established and performed successfully over the PLMN, and update and store, in the data store, the services established and performed successfully over the PLMN.

14. The UE of claim 10, wherein the timers-broadcasted and configured timer comprises a non-access stratum (NAS) timer and an access stratum (AS) timer.

15. The UE of claim 10, wherein a network type of the respective PLMN is identified based on at least one of:

a timing advance value configured as part of a media access control (MAC) control elements (CE), the timing advance value being a MAC CE to control uplink signal transmission timing, and the UE receiving a higher value of timing advance configured in the NTN compared to the TN;

a round trip time (RTT);

a broadcast message comprising the network type broadcasted by the network in one or more information elements (IE), the broadcast message comprising at least one of a master information block (MIB) and a system information block (SIB); and a non-access Stratum (NAS) signaling and an access stratum (AS) signaling comprising the network type broadcasted by the network in one or more information elements (IEs).

16. The UE of claim 15, wherein the network type is identified further based on the RTT including:

registering, over a PLMN available in the network coverage area, measuring, the RTT of the PLMN, storing, the RTT in a data store, and comparing, the RTT to an RTT threshold value to determine the network type, wherein the PLMN having RTT greater than the RTT threshold value is the NTN, or the RTT is lower than the RTT threshold value, the PLMN is the TN.

17. The UE of claim 10, wherein the instructions, when executed by the one or more processors individually or collectively, further cause the UE to:

maintain, a second list of the one or more PLMN that belong to the NTN, set, the second list as a last priority for the selection of the one or more PLMNs, and update, the second list of the one or more PLMN whenever a new NTN is identified in the network coverage area.

18. The UE of claim 11, wherein the one or more PLMN with a signal strength that is higher is given a higher priority, and stored in the data store higher in the list of the one or more PLMNs.

19. One or more non-transitory computer-readable storage media storing one or more computer programs including computer-executable instructions that, when executed by one or more processors of a user equipment (UE), cause the UE to perform operations for selecting a public land mobile network (PLMN), the operations comprising:

identifying, by the UE, one or more PLMNs available in a network coverage area of the UE;

identifying, by the UE, a network type of the one or more PLMNs available in the network coverage area of the UE based on a broadcasted and configured timer, the network type comprising at least one of a terrestrial network (TN) and a non-terrestrial network (NTN);

identifying, by the UE, a number of services provided by a respective PLMN from the one or more PLMNs;

prioritizing, by the UE, the one or more PLMNs available in the network coverage area of the UE based on the number of services and the network type; and performing, by the UE, a selection of the one or more PLMN based on the prioritizing result, wherein the network type is determined to be the NTN, in case that a value determined for the broadcasted and configured timer is greater than a first threshold value, and wherein the network type is determined to be the TN, in case that the value determined for the broadcasted and configured timer is lower than the first threshold value.

\* \* \* \* \*